United States Patent
Young et al.

(10) Patent No.: US 12,521,419 B2
(45) Date of Patent: Jan. 13, 2026

(54) USE OF ANTI-AGING GLYCOPEPTIDES TO ENHANCE PANCREATIC CELL HEALTH, SURVIVAL AND IMPROVE TRANSPLANT OUTCOME

(71) Applicant: Protokinetix Inc., St. Mary's, WV (US)

(72) Inventors: Lachlan Grant Young, Nanimo (CA); A.M. James Shapiro, Edmonton (CA)

(73) Assignee: Protokinetix Inc., St. Mary's, WV (US)

( * ) Notice: Subject to any disclaimer, the term of this patent is extended or adjusted under 35 U.S.C. 154(b) by 0 days.

(21) Appl. No.: 18/463,221

(22) Filed: Sep. 7, 2023

(65) Prior Publication Data
US 2023/0414675 A1 Dec. 28, 2023

Related U.S. Application Data

(63) Continuation of application No. 17/038,518, filed on Sep. 30, 2020, now abandoned, which is a continuation of application No. 15/631,260, filed on Jun. 23, 2017, now abandoned, which is a continuation of application No. 14/728,535, filed on Jun. 2, 2015, now abandoned.

(60) Provisional application No. 62/007,626, filed on Jun. 4, 2014.

(51) Int. Cl.
A61K 35/39 (2015.01)
C12N 5/071 (2010.01)

(52) U.S. Cl.
CPC ............ *A61K 35/39* (2013.01); *C12N 5/0676* (2013.01); *C12N 2501/90* (2013.01); *C12N 2501/998* (2013.01); *C12N 2501/999* (2013.01)

(58) Field of Classification Search
CPC .......... A61K 35/39; C12N 5/0676; A61P 3/10
See application file for complete search history.

(56) References Cited

U.S. PATENT DOCUMENTS

2009/0311203 A1 12/2009 Castelot Deliencourt-Godefroy et al.

FOREIGN PATENT DOCUMENTS

WO WO-2006059227 A1 * 6/2006 ............. C07K 9/003
WO 2007/125203 A1 11/2007

OTHER PUBLICATIONS

Rajotte, Affect of AAGP on the Functionality of Transplated Islet Cells in a Diabetic Mouse Model, accessed at https://web.archive.org/web/20191220184424/http://www.protokinetix.com/results/assays/In_Vivo.php Jun. 4, 2025, published 2007 (Year: 2007).*

Matsumoto, Shuichiro, et al. "Effects of synthetic antifreeze glycoprotein analogue on islet cell survival and function during cryopreservation." Cryobiology 52.1 (2006): 90-98. (Year: 2006).*
Krautz, Christian, et al. "Effects of immunosuppression on alpha and beta cell renewal in transplanted mouse islets." Diabetologia 56 (2013): 1596-1604. (Year: 2013).*
Sakata, Naoaki, et al. "Animal models of diabetes mellitus for islet transplantation." Journal of Diabetes Research Jan. 2012 (2012): 256707. (Year: 2012).*
De Kort, Hanneke, et al. "Islet transplantation in type 1 diabetes." Bmj 342 (2011). (Year: 2011).*
Younes, Nidal A., Jean-Manuel Nothias, and Marc R. Garfinkel. "Islet transplantation: the quest for an ideal source." Annals of Saudi medicine 28.5 (2008): 325-333. (Year: 2008).*
Shapiro, AM James, et al. "Islet transplantation in seven patients with type 1 diabetes mellitus using a glucocorticoid-free immunosuppressive regimen." New England Journal of Medicine 343.4 (2000): 230-238. (Year: 2000).*
Rajotte, Affect of AAGP on the Functionality of Transplated Islet Cells in a Diabetic Mouse Model, accessed at https://web.archive.org/web/20191220184424/http://www.protokinetix.com/results/assays/In_Vivo.php Jun. 4, 2025, published 2007 (Year: 2007) (Year: 2007).*
Matsumoto, Shuichiro, et al. "Effects of synthetic antifreeze glycoprotein analogue on islet cell survival and function during cryopreservation." Cryobiology 52.1 (2006): 90-98. (Year: 2006) (Year: 2006).*
Krautz, Christian, et al. "Effects of immunosuppression on alpha and beta cell renewal in transplanted mouse islets." Diabetologia 56 (2013): 1596-1604. (Year: 2013) (Year: 2013).*
Sakata, Naoaki, et al. "Animal models of diabetes mellitus for islet transplantation." Journal of Diabetes Research Jan. 2012 (2012): 256707. (Year: 2012) (Year: 2012).*
Supplementary European Search Report of 15802931.4; Munich; Jan. 5, 2018; Garabatos-Perera, J.

(Continued)

*Primary Examiner* — Jeanette M Lieb
*Assistant Examiner* — David Paul Bowles
(74) *Attorney, Agent, or Firm* — Kilpatrick Townsend & Stockton LLP

(57) ABSTRACT

The present disclosure relates to an in vitro method for enhancing engraftment of isolated pancreatic cells comprising the step of contacting an isolated pancreatic cell prior to a transplantation in a subject in need thereof, with a gem-difluorinated C-glycopeptide compound of general formula I, or a pharmaceutically acceptable base, addition salt with an acid, hydrate or solvate of the compound of general formula I:

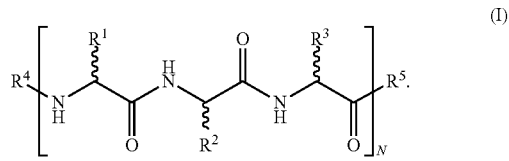

10 Claims, 12 Drawing Sheets

(56) References Cited

OTHER PUBLICATIONS

Gala-Lopez et al.: "Antiaging Glycopeptide Protects Human Islets Against Tacrolimus-Related Injury and Facilitates Engraftment in Mice"; Diabetes; vol. 65; Feb. 2016; pp. 451-462.

AAGPs™—Anti-Aging Glyco Peptides Enhancing Cell, Tissue and Organ Integrity Molecular and biological attributes of lead AAGP molecule [online]. ProtoKinetix. Mar. 2010 (Mar. 2010) [retrieved on Aug. 7, 2015 (Aug. 7, 2015)]. Retrieved from the Internet: <Website URL: http://web.archive.org/web/20131102194100/http://protokinetix.com/pdf/aagp-presentation-march-2010.pdf>.

Affect of AAGPTM on the functionality of transplanted islet cells in a diabetic mouse model [online]. Protokinetix, Jan. 2007 (Jan. 2007) [retrieved on Jun. 23, 2015 (Jun. 23, 2015)]. Retrieved from the Internet: <Website URL: http://web.archive.org/web/20131102204306/http://protokinetix.com/results/assays/In_Vivo.php.

Protokinetix' AAGP(TM) Improves Effectiveness of Diabetes Treatment [online]. Business Wire, May 17, 2007 (May 17, 2007) [retrieved on Aug. 7, 2015 (Aug. 7, 2015)]. Retrieved from the Internet: <Website URL: http://www.businesswire.com/news/home/20070517005270/en/ProtoKinetix-AAGP-TM-Improves-Effectiveness-of-Diabetes-Treatment>.

Protective effects of low concentrations (1 and 5 mg/ml) of AAGP™ on oxidative stress (hydrogen peroxide and UVC) induced death in human adult and neonatal fibroblasts at 37° C. [online]. ProtoKinetix, Jan. 2006 (Jan. 2006) [retrieved on Aug. 7, 2015 (Aug. 7, 2015)]. Retrieved from the Internet: <Website URL: http://protokinetix.com/results/assays/Ox_stress_low_concs_human_and_adult_fibro_2006.php>.

Matsumoto, et al., "Effects of synthetic antifreeze glycoprotein analogue on islet cell survival and function during cryopreservation," Cryobiology. Feb. 2006 (Feb. 2006), vol. 52, pp. 90-98.

Gala-Lopez, et al., "Biologic agents in islet transplantation," Curr Diab Rep., Oct. 2013 (Oct. 2013), vol. 13, pp. 713-722.

International Search Report of PCT/CA2015/050509; Aug. 19, 2015; R. Atkins.

Hughes, et al. "Principles of early drug discovery." British journal of pharmacology 162, No. 6 (2011): 1239-1249.

Ansel et al. Ansel's pharmaceutical dosage forms and drug delivery systems. Lippincott Williams & Wilkins, 2013, pp. 48-53.

Haskins, et al. "Oxidative stress in type 1 diabetes." Annals of the New York Academy of Sciences 1005, No. 1 (2003): 43-54.

\* cited by examiner

A

B

C

D

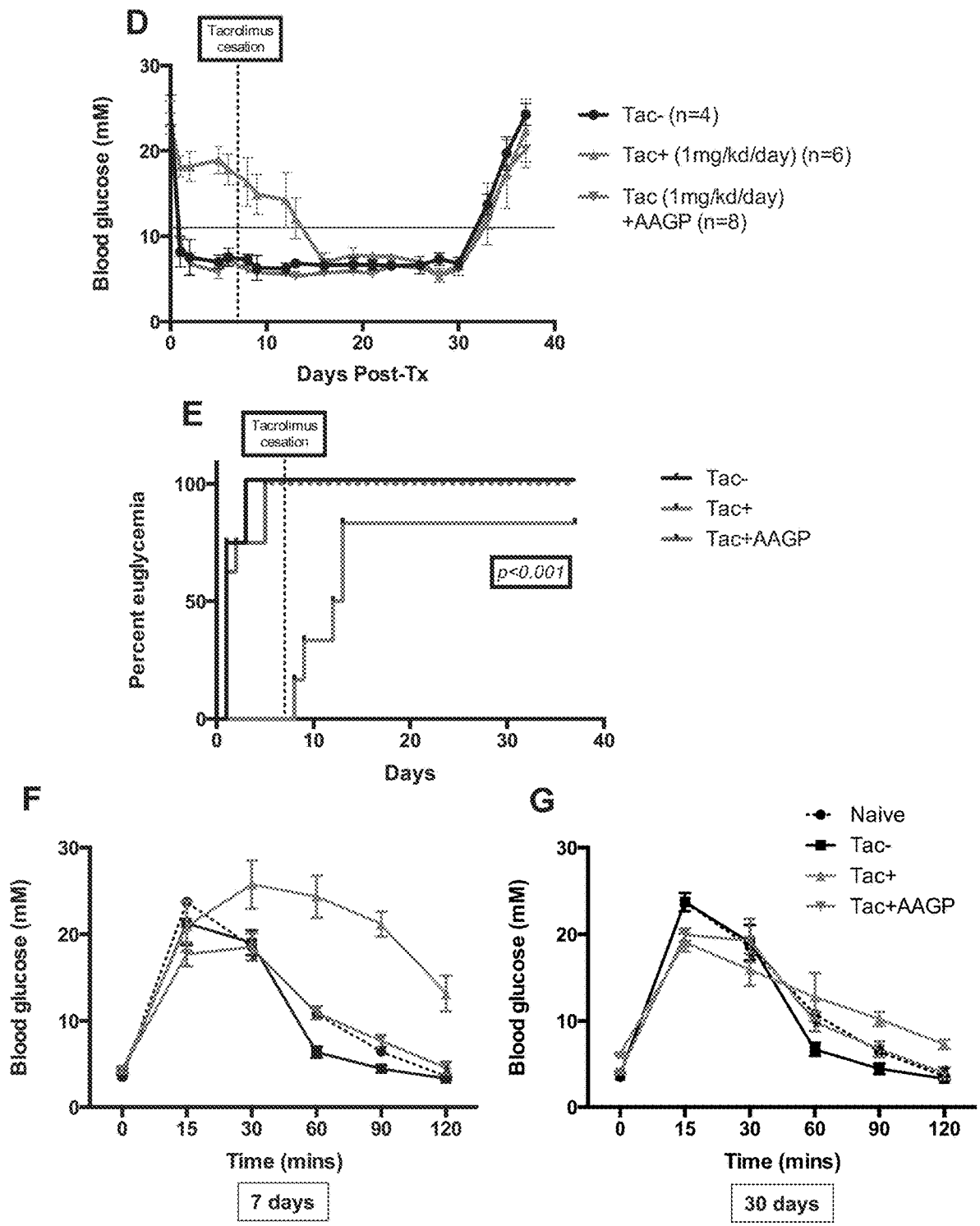
Fig. 11 - Con't

USE OF ANTI-AGING GLYCOPEPTIDES TO ENHANCE PANCREATIC CELL HEALTH, SURVIVAL AND IMPROVE TRANSPLANT OUTCOME

CROSS-REFERENCE TO RELATED APPLICATIONS

This application is filed under 37 CFR 1.53(b) as a continuation application. This application claims priority under § 120 of U.S. patent application Ser. No. 17/038,518, filed on Sep. 30, 2020, which claims priority under § 120 of U.S. patent application Ser. No. 15/631,260 filed on Jun. 23, 2017, which claims priority of U.S. patent application Ser. No. 14/728,535 filed on Jun. 2, 2015, which claims priority of U.S. provisional patent application 62/007,626, filed Jun. 4, 2014, the specifications of which are hereby incorporated by reference in their entireties.

BACKGROUND

(a) Field

The subject matter disclosed generally relates to the use of anti-aging glycopeptides. More particularly, the subject matter relates to the use of anti-aging glycopeptides to enhance human pancreatic cells engraftment.

(b) Related Prior Art

Antifreeze biological compounds, and particularly glycoproteins, exist in the natural environment. These compounds are present for example in some fishes, enabling them to survive in a low temperature environment (i.e. near zero or sub-zero temperatures). Scientists have been investigating how antifreeze compounds taken from the natural environment (fish, amphibians, plants, insects, etc.) have an influence on these phenomena. Research has focused on the synthesis of analogous compounds that are sufficiently stable and whose activity is at least equal to or even greater than the activity of the natural molecules, for commercial applications.

Anti-freeze proteins (AFP) have generated increasing interest for their ability to protect cells under a variety of conditions. They are naturally encountered in Arctic and Antarctic fish as well as other cold-climate dwelling invertebrates, and are responsible for maintaining cells and tissue functional at sub-zero temperatures. AFP were successfully isolated in the 1950s and have demonstrated the ability to non-colligatively lower the freezing temperature of body fluids by binding to ice crystals.

Early experiments with these compounds in the field of organ and tissue transplantation showed promising results, making them attractive therapeutic candidates to protect cells against harmful conditions associated with the process of retrieval-preservation-reperfusion. Moreover, further benefits have also been demonstrated during cryopreservation of different cells, including islets of Langerhans, which significantly increased their viability and function when supplemented with AFP during cryostasis. The Anti-aging glycopeptides (AAGP™) used in the present invention derive from attempts to obtain analogs of anti-freeze glycoproteins.

Anti-aging glycopeptides (AAGP™) compounds are gem difluorinated C-glycopeptides which have been proposed to have applicability under harsh cellular stresses, such as nutrient deprivation, high temperature and cryopreservation, oxidative stress from hydrogen peroxide ($H_2O_2$), UV irradiation, and inflammation.

Beta cell transplantation is the transplantation of isolated beta islet cells from a donor pancreas and into another person. It is an experimental treatment for type 1 diabetes mellitus. Once transplanted, the islet beta cells begin to produce insulin, actively regulating the level of glucose in the blood. While significant progress has been made in the islet transplantation field, many obstacles remain that currently preclude its widespread application. Two of the most important limitations are the currently inadequate means for preventing islet rejection, and the limited supply of beta islet cells for transplantation. Current immunosuppressive regimens are capable of preventing beta islet cells failure for months to years, but the agents used in these treatments are expensive and may increase the risk for specific malignancies and opportunistic infections. In addition, and somewhat ironically, the most commonly used agents [including daclizumab (Zenapax™), sirolimus (Rapamune™) and tacrolimus (Prograf™)] are also known to impair normal beta islet cells function and/or insulin action.

Long-term results of islet transplantation have significantly improved in highly specialized centers, with a 5-year insulin-independence rate exceeding 50%. A proportion requires reintroduction of insulin therapy at delayed timepoints. Numerous factors account for substantial graft loss especially in the early phase post intraportal infusion, and insufficient islet mass may limit durable glycemic control in patients. One factor leading to acute graft loss is hypoxia, as many islets die immediately after transplant before adequate vascularization is re-established. Other reasons for graft loss include the instant blood-mediated inflammatory reaction, alloimmunity, recurrence of autoimmunity and chronic exposure to diabetogenic immunosuppressive agents. These factors account for immediate and early islet loss of approximately 60%, resulting in an insufficient islet mass to maintain a functional transplant.

In light of this evidence, significant attention is now being directed towards AFP and their potential use in health science, particularly in the field of transplantation. However, there is a paucity of data reflecting potential impact in islet transplantation, where major initial graft lost seems to be unavoidable. The cytoprotective effect of this AAGP™ compound is tested in isolated human islets maintained in normothermic culture conditions, exposed to toxins and transplanted into an immunodeficient mouse model as an indicator of preservation of the initial islet mass.

Therefore, there is a need for methods of improving the supply of isolated islet cells.

There is a need for methods of improving the health and survival of isolated cells.

SUMMARY

According to an embodiment, there is provided an in vitro method for enhancing engraftment of isolated pancreatic cells, isolated pancreatic progenitor cells, or both comprising the step of:

a) contacting an isolated pancreatic cell, an isolated pancreatic progenitor cell, or both prior to a transplantation in a subject in need thereof, with a gem-difluorinated C-glycopeptide compound of general formula I, or a pharmaceutically acceptable base, addition salt with an acid, hydrate or solvate of the compound of general formula I:

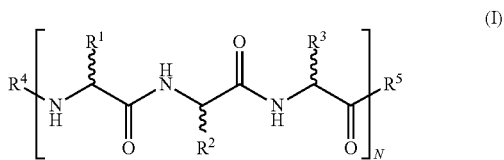

in which:

N is an integer between 1 and 5, $R^4$=H, $AA_1$, or $AA_1$-$AA_2$, $R^5$=OH, $AA_1$, or $AA_1$-$AA_2$, $AA_1$ and $AA_2$ independently represent amino acids with a non-polar side chain and $R^1$, $R^2$, $R^3$ are independent groups in which two of $R^1$, $R^2$ and $R^3$ are selected from H, $CH_3$, $CH_2Ph$, $CH(CH_3)_2$, $CH_2CH(CH_3)_2$ or $CH(CH_3)CH_2CH_3$ and the remaining $R^1$, $R^2$, $R^3$ is

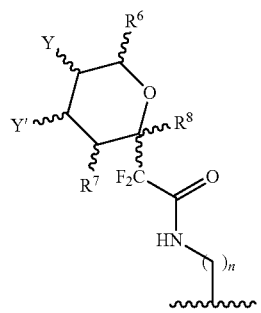

in which:

n is an integer between 3 and 4,

Y, Y' are independent groups
in which Y, Y'=H, OR, $N_3$, NR'R", or SR''',
where R=H, benzyl, trimethylsilyl, tert-butyldimethylsilyl, tert-butyldiphenylsilyl or acetate group, R', R" independently=H, alkyl, allyl, benzyl, tosylate group, C(=O)— alkyl or C(=O)—Bn, R'''=H, alkyl, or acetate group, $R^6$ is H, $CH_3$, $CH_2OH$, $CH_2$-glycoside group or $CH_2$—OGP in which GP is a protector group selected from alkyl, benzyl, trimethylsilyl, tert-butyldimethylsilyl, tert-butyldiphenylsilyl, or acetate group, $R^7$=OH, OGP', $NH_2$, $N_3$, NHGP' or NGP'GP" in which GP' and GP" are independently selected from alkyl, benzyl, trimethylsilyl, tert-butyldimethylsilyl, tert-butyldiphenylsilyl, or acetate group, $R^8$ is a hydrogen atom H or a free or protected alcohol function, and if $R^1$=$R^2$=H, $CH_3$, $CH_2Ph$, $CH(CH_3)_2$, $CH_2CH(CH_3)_2$, or $CH(CH_3)CH_2CH_3$ then $R^3$=

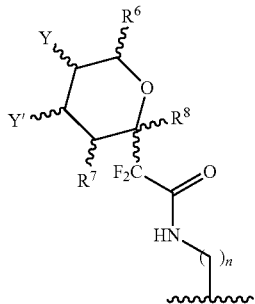

in which: n is an integer between 3 and 4,

Y, Y' are independent groups
in which Y, Y'=H, OR, $N_3$, NR'R", or SR''',
where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, $R^6$ is H, $CH_3$, $CH_2OH$, $CH_2$-glycoside group, or $CH_2$—OGP in which GP is a protector group selected from alkyl, benzyl, trimethylsilyl, tertbutyldimethylsilyl, tert-butyldiphenylsilyl, or acetate group, $R^7$=OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group, $R^8$ is a hydrogen atom H or a free or protected alcohol function, if $R^1$=$R^3$=H, $CH_3$, $CH_2Ph$, $CH(CH_3)_2$, $CH_2CH(CH_3)_2$, or $CH(CH_3)CH_2CH_3$ then $R^2$=

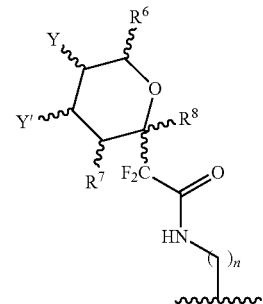

in which: n is an integer between 3 and 4,

Y, Y' are independent groups
in which Y, Y'=H, OR, $N_3$, NR'R", or SR''',
where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, $R^6$ is H, $CH_3$, $CH_2OH$, $CH_2$-glycoside group, or $CH_2$—OGP in which GP is a protector group selected from alkyl, benzyl, trimethylsilyl, tert-butyldimethylsilyl, tert-butyldiphenylsilyl, or acetate group, $R^7$=OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group, $R^8$ is a hydrogen atom H or a free or protected alcohol function, if $R^2=R^3=H$, $CH_3$, $CH(CH_3)_2$, $CH_2CH(CH_3)_2$, or $CH(CH_3)CH_2CH_3$ then $R^1=$

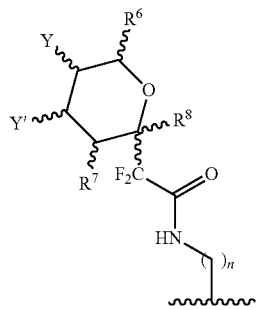

in which: n is an integer between 3 and 4,
Y, Y' are independent groups
in which Y, Y' H, OR, $N_3$, NR'R", or SR'",
where R=H, benzyl, trimethylsilyl, tert-butyldimethylsilyl, tert-butyldiphenylsilyl, or acetate group,
R', R" independently=H, alkyl, allyl, benzyl, tosylate group, C(=O)-alkyl, or C(=O)—Bn,
R'"=H, alkyl, or acetate group,
$R^6$ is H, $CH_3$, $CH_2OH$, $CH_2$-glycoside group, or $CH_2$—OGP in which GP is a protector group selected from alkyl, benzyl, trimethylsilyl, tert-butyldimethylsilyl, tert-butyldiphenylsilyl, or acetate group,
$R^7$=OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group,
$R^8$ is a hydrogen atom H or a free or protected alcohol function.

According to another embodiment, there is provided an in vitro method for improving the insulin secretory function of isolated pancreatic beta cells prior to transplantation in a subject in need thereof, comprising the step of:
a) contacting an isolated pancreatic beta cell with a gem-difluorinated C-glycopeptide compound of general formula I, or a pharmaceutically acceptable base, addition salt with an acid, hydrate or solvate of the compound of general formula I as described above.

According to another embodiment, there is provided an in vitro method for protecting isolated pancreatic cells, isolated pancreatic progenitor cells, or both from immunosuppressant drug toxicity prior to a transplantation in a subject in need thereof comprising the step of:
a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above.

According to another embodiment, there is provided an in vitro method for decreasing an inflammatory response of isolated pancreatic cells, isolated pancreatic progenitor cells, or both prior to a transplantation in a subject in need thereof comprising the step of:
a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above.

According to another embodiment, there is provided a method of transplanting isolated pancreatic cells, isolated pancreatic progenitor cells, or both in a subject in need thereof comprising the steps of:
a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above, and
b) transplanting the treated isolated pancreatic cell of step a) in said subject in need thereof.

The method may further comprise step a') before step a):
a') isolating pancreatic cells, pancreatic progenitor cells, or both. The method may also further comprising step b') before step b) contacting the isolated pancreatic cell, the isolated pancreatic progenitor cells, or both of step a) with an immunosuppressant drug.

In the methods of the present invention, the isolated pancreatic cell may be an isolated alpha cell, an isolated beta cell, an isolated delta cell, an isolated gamma cell, an epsilon cell, or a combination thereof, and preferably the isolated pancreatic cell may be an isolated beta cell.

The immunosuppressant drug may be one of daclizumab, sirolimus, tacrolimus, cyclosporine, or combinations thereof.

The subject may be a human subject.

The isolated pancreatic cell may be isolated from a live donor, a cadaveric donor, or combinations thereof.

In the methods of the present invention, the compound of formula I may be a compound of formula II:

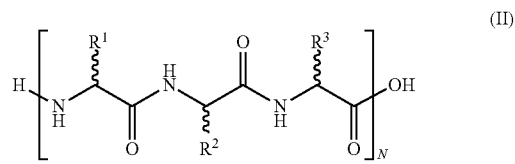

in which: N is an integer between 1 and 5, and
$R^1$, $R^2$, $R^3$ are independent groups in which two of $R^1$, $R^2$ and $R^3$ are selected from H, $CH_3$ and the remaining $R^1$, $R^2$ and $R^3$ is

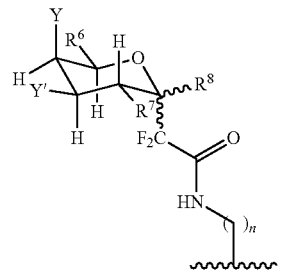

in which: n is an integer between 3 and 4,
Y, Y' are independent groups
in which Y, Y'=H, OR, $N_3$, NR'R" or SR'",
where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, R⁶ is selected from H, CH₃, CH₂OH, CH₂—OGP in which GP is a protector group selected from alkyl, benzyl, trimethylsilyl, tert-butyldimethylsilyl, tert-butyldiphenylsilyl, or acetate group, R⁷=OH, OGP', NH₂, N₃, NHGP', NGP'GP" in which GP' and GP" are independently selected from alkyl, benzyl, trimethylsilyl, tert-butyldimethylsilyl, tert-butyldiphenylsilyl or acetate group, R⁸ is a hydrogen atom H or a free or protected alcohol function, and if R¹=R²=H or CH₃, then R³=

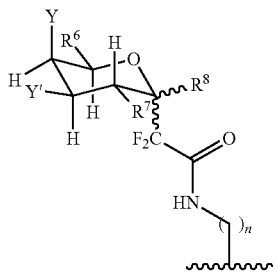

in which: n is an integer between 3 and 4,

Y, Y' are independent groups in which Y, Y'=H, OR, N₃, NR'R", or SR'", where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, R⁶ is selected from H, CH₃, CH₂OH, CH₂—OGP in which GP is a protector group selected from alkyl, benzyl, trimethylsilyl, tert-butyldimethylsilyl, tert-butyldiphenylsilyl, or acetate group, R⁷=OH, OGP', NH₂, N₃, NHGP', NGP'GP" in which GP' and GP" are independently selected from alkyl, benzyl, trimethylsilyl, tert-butyldimethylsilyl, tert-butyldiphenylsilyl, or acetate group, R⁸ is a hydrogen atom H or a free or protected alcohol function, if R¹=R³=H or CH₃, then R²=

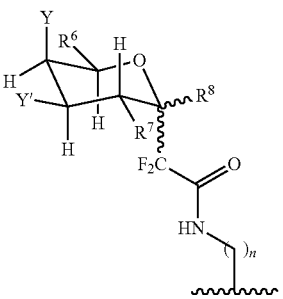

in which: n is an integer between 3 and 4,

Y, Y' are independent groups in which Y, Y'=H, OR, N₃, NR'R", SR'", where R=H, benzyl, trimethylsilyl, tert-butyldimethylsilyl, tert-butyldiphenylsilyl, or acetate group, R', R" independently=H, alkyl, allyl, Bn, tosylate, C(=O)-alkyl, or C(=O)—Bn, R'''=H, alkyl, or acetate group, R⁶ is selected from H, CH₃, CH₂OH, or CH₂—OGP in which GP is a protector group selected from alkyl, benzyl, trimethylsilyl, tert-butyldimethylsilyl, tert-butyldiphenylsilyl, or acetate group, R⁷=OH, OGP', NH₂, N₃, NHGP', or NGP'GP" in which GP' and GP" are independently selected from alkyl, benzyl, trimethylsilyl, tert-butyldimethylsilyl, tert-butyldiphenylsilyl, or acetate group, R⁸ is a hydrogen atom H or a free or protected alcohol function, if R²=R³=H or CH₃, then R¹=

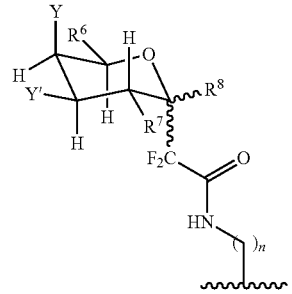

in which: n is an integer between 3 and 4,

Y, Y' are independent groups in which Y, Y' H, OR, N₃, NR'R", or SR'", where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, R⁶ is selected from H, CH₃, CH₂OH, or CH₂—OGP in which GP is a protector group selected from alkyl, benzyl, trimethylsilyl, tert-butyldimethylsilyl, tert-butyldiphenylsilyl, or acetate group, R⁷=OH, OGP', NH₂, N₃, NHGP', or NGP'GP" in which GP' and GP" are independently selected from alkyl, benzyl, trimethylsilyl, tert-butyldimethylsilyl, tert-butyldiphenylsilyl, or acetate group, R⁸ is a hydrogen atom or a free or protected alcohol function.

The compound of formula I may be a compound of formula III:

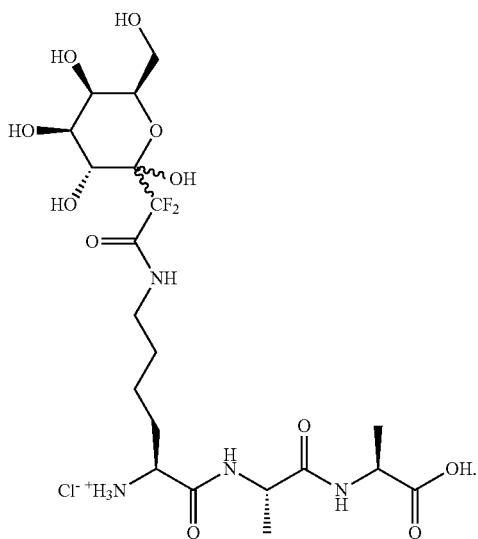
(III)

The contacting the isolated pancreatic cells may be with from about from about 0.01 mg/ml to about 5 mg/ml of said compound of formula I, formula II or formula III, or from about from about 1 mg/ml to about 5 mg/ml of said compound of formula I, formula II or formula III.

According to another embodiment, there is provided an isolated pancreatic cell, an isolated pancreatic progenitor cell, or both prepared according to the method of the present invention.

According to another embodiment, there is provided a method of transplanting isolated pancreatic cells, isolated pancreatic progenitor cells, or both in a subject in need thereof comprising the steps of:
a) transplanting an isolated pancreatic cell, an isolated pancreatic progenitor cell, or both prepared according to the method of the present invention, in said subject in need thereof.

According to another embodiment, there is provided a method of treating diabetes comprising the step of:
a) transplanting an isolated pancreatic cell, an isolated pancreatic progenitor cell, or both prepared according to the method of the present invention, in said subject in need thereof.

According to another embodiment, there is provided a use of an isolated pancreatic cell, an isolated pancreatic progenitor cell, or both prepared according to the method of the present invention, for transplantation to a subject in need thereof.

According to another embodiment, there is provided a use of an isolated pancreatic cell, an isolated pancreatic progenitor cell, or both prepared according to the method of the present invention, for treatment of diabetes in a subject in need thereof.

According to another embodiment, there is provided an isolated pancreatic cell prepared, an isolated pancreatic progenitor cell, or both according to the method of the present invention, for transplantation to a subject in need thereof According to another embodiment, there is provided an isolated pancreatic cell, an isolated pancreatic progenitor cell, or both contacted with a gem-difluorinated C-glycopeptide compound of general formula I, or a pharmaceutically acceptable base, addition salt with an acid, hydrate or solvate of the compound of general formula I as described above.

The compound of general formula I as described above may be a compound of formula II as described above, and/or formula III as described above.

The isolated pancreatic cell may be an isolated alpha cell, an isolated beta cell, an isolated delta cell, an isolated gamma cell, an epsilon cell, or a combination thereof, and preferably the isolated pancreatic cell may be an isolated beta cell.

The isolated pancreatic cell, isolated pancreatic progenitor cell, or both may be contacted with from about from about 0.01 mg/ml to about 5 mg/ml of said compound of formula I, formula II or formula III, or from about from about 1 mg/ml to about 5 mg/ml of said compound of formula I, formula II or formula III.

According to another embodiment, there is provided a use of a gem-difluorinated C-glycopeptide compound of general formula I as described above, or a pharmaceutically acceptable base, addition salt with an acid, hydrate or solvate of the compound of general formula I as described above, for enhancing engraftment of isolated pancreatic cells, isolated pancreatic progenitor cells, or both in a subject in need thereof.

According to another embodiment, there is provided a use of a gem-difluorinated C-glycopeptide compound of general formula I as described above, or a pharmaceutically acceptable base, addition salt with an acid, hydrate or solvate of the compound of general formula I as described above, for improving the insulin secretory function of isolated pancreatic beta cells, isolated pancreatic progenitor cells, or both prior to transplantation in a subject in need thereof.

According to another embodiment, there is provided a use of a gem-difluorinated C-glycopeptide compound of general formula I as described above, or a pharmaceutically acceptable base, addition salt with an acid, hydrate or solvate of the compound of general formula I, for protecting isolated pancreatic cells, isolated pancreatic progenitor cells, or both from immunosuppressant drug toxicity prior to a transplantation in a subject in need thereof.

According to another embodiment, there is provided a use of a gem-difluorinated C-glycopeptide compound of general formula I as described above, or a pharmaceutically acceptable base, addition salt with an acid, hydrate or solvate of the compound of general formula I, for decreasing an inflammatory response of isolated pancreatic cells, isolated pancreatic progenitor cells, or both prior to a transplantation in a subject in need thereof.

The isolated pancreatic cell may be an isolated alpha cell, an isolated beta cell, an isolated delta cell, an isolated gamma cell, an epsilon cell, or a combination thereof, and preferably the isolated pancreatic cell may be an isolated beta cell.

The immunosuppressant drug may be one of daclizumab, sirolimus, tacrolimus, cyclosporine, or combinations thereof.

The subject may be a human subject.

The isolated pancreatic cell, isolated pancreatic progenitor cell, or both may be isolated from a live donor, a cadaveric donor, or combinations thereof.

The compound of general formula I as described above may be a compound of formula II as described above, and/or formula III as described above.

The isolated pancreatic cell, isolated pancreatic progenitor cell, or both may be contacted with from about from about 0.01 mg/ml to about 5 mg/ml of said compound of formula I, formula II or formula III, or from about from about 1 mg/ml to about 5 mg/ml of said compound of formula I, formula II or formula III.

According to another embodiment, there is provided a gem-difluorinated C-glycopeptide compound of general formula I as described above, or a pharmaceutically acceptable base, addition salt with an acid, hydrate or solvate of the compound of general formula I as described above, for use in enhancing engraftment of isolated pancreatic cells, isolated pancreatic progenitor cells, or both in a subject in need thereof.

According to another embodiment, there is provided a gem-difluorinated C-glycopeptide compound of general formula I as described above, or a pharmaceutically acceptable base, addition salt with an acid, hydrate or solvate of the compound of general formula I as described above, for use in improving the insulin secretory function of isolated pancreatic beta cells, isolated pancreatic progenitor cells, or both prior to transplantation in a subject in need thereof.

According to another embodiment, there is provided a gem-difluorinated C-glycopeptide compound of general formula I as described above, or a pharmaceutically acceptable base, addition salt with an acid, hydrate or solvate of the compound of general formula I as described above, for use in protecting isolated pancreatic cells, isolated pancreatic progenitor cells, or both from immunosuppressant drug toxicity prior to a transplantation in a subject in need thereof.

According to another embodiment, there is provided a gem-difluorinated C-glycopeptide compound of general formula I as described above, or a pharmaceutically acceptable base, addition salt with an acid, hydrate or solvate of the compound of general formula I as described above, for use in decreasing an inflammatory response of isolated pancreatic cells, isolated pancreatic progenitor cells, or both prior to a transplantation in a subject in need thereof.

The isolated pancreatic cell may be an isolated alpha cell, an isolated beta cell, an isolated delta cell, an isolated gamma cell, an epsilon cell, or a combination thereof, and preferably the isolated pancreatic cell may be an isolated beta cell.

The immunosuppressant drug may be one of daclizumab, sirolimus, tacrolimus, cyclosporine, or combinations thereof.

The subject may be a human subject.

The isolated pancreatic cell, isolated pancreatic progenitor cell, or both may be isolated from a live donor, a cadaveric donor, or combinations thereof.

The compound of general formula I as described above may be a compound of formula II as described above, and/or formula III as described above.

The isolated pancreatic cell, isolated pancreatic progenitor cell, or both may be contacted with from about from about 0.01 mg/ml to about 5 mg/ml of said compound of formula I, formula II or formula III, or from about from about 1 mg/ml to about 5 mg/ml of said compound of formula I, formula II or formula III.

The following terms are defined below.

The term «composition» as used herein is intended to encompass a product comprising the specified ingredients in the specified amounts, as well as any product which results, directly or indirectly, from combination of the specified ingredients in the specified amounts. Such term in relation to pharmaceutical composition or other compositions in general, is intended to encompass a product comprising the active ingredient(s) and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the pharmaceutical compositions or other compositions in general of the present invention encompass any composition made by admixing a compound of the present invention and a pharmaceutically acceptable carrier. By "pharmaceutically acceptable" or "acceptable" it is meant the carrier, diluent or excipient must be compatible with the other ingredients of the formulation and not deleterious to the recipient thereof.

The terms "pancreatic cell", "isolated pancreatic cell", "islet cells", or "isolated islet cells" are intended to mean cells derived from the Islet of Langerhans from the pancreas from live or cadaveric donors isolated through known protocols and/or as described herein below, as well as cells of pancreatic origin grown in vivo, ex vivo and/or in vitro. The cells of the Islet of Langerhans include alpha cells, producing the hormone glucagon and representing about 15-20% of the islet cells, the beta cells producing the hormones insulin and amylin, and representing about 65-80% of the islet cells, the delta cells producing the hormone somatostatin and representing about 3-10% of the islet cells, the PP cells (also known as gamma cells) producing the hormone pancreatic polypeptide (3-5% of the islet cells, and the epsilon cells producing the hormone ghrelin, representing <1% of the islet cells.

The terms "pancreatic beta cell" and "isolated pancreatic beta cell" is intended to mean cells derived from pancreas from live or cadaveric donors isolated through known protocols and/or as described herein below, as well as beta cells of pancreatic origin grown in vivo, ex vivo and/or in vitro.

The terms "pancreatic progenitor" and "isolated pancreatic progenitor" is intended to mean cells derived from any suitable sources, such as embryonic stem cells (of human or other origin), that have differentiated or are differentiate naturally or through known protocols into pancreatic progenitor cells in vivo, ex vivo or in vitro. The isolated pancreatic progenitor cells have the potential to become pancreatic beta cells through further differentiation naturally or through treatment with known protocols, in vivo, ex vivo or in vitro. For example, the isolated pancreatic progenitor cells may be obtained in vitro through a differentiation protocol, and further differentiated into pancreatic beta cells in vitro through a differentiation protocol. Also, the isolated pancreatic progenitor cells may be obtained in vitro through a differentiation protocol, and further differentiated into pancreatic beta cells in vivo after implantation/transplantation into a patient in need thereof.

"Alkyl", as well as other groups having the prefix "alk", such as alkoxy and alkanoyl, means carbon chains which may be linear or branched, and combinations thereof, unless the carbon chain is defined otherwise. Examples of alkyl groups include methyl, ethyl, propyl, isopropyl, butyl, sec- and tert-butyl, pentyl, hexyl, heptyl, octyl, nonyl, and the like. Where the specified number of carbon atoms permits, e.g., from C3-10, the term alkyl also includes cycloalkyl groups, and combinations of linear or branched alkyl chains combined with cycloalkyl structures. When no number of carbon atoms is specified, C1-6 is intended.

"Cycloalkyl" is a subset of alkyl and means a saturated carbocyclic ring having a specified number of carbon atoms. Examples of cycloalkyl include cyclopropyl, cyclobutyl, cyclopentyl, cyclohexyl, cycloheptyl, cyclooctyl, and the like. A cycloalkyl group generally is monocyclic unless stated otherwise. Cycloalkyl groups are saturated unless otherwise defined.

The term "alkoxy" refers to straight or branched chain alkoxides of the number of carbon atoms specified (e.g., C1-6 alkoxy), or any number within this range [i.e., methoxy (MeO—), ethoxy, isopropoxy, etc.].

The term "alkylthio" refers to straight or branched chain alkylsulfides of the number of carbon atoms specified (e.g., C1-6 alkylthio), or any number within this range [i.e., methylthio (MeS—), ethylthio, isopropylthio, etc.].

The term "alkylamino" refers to straight or branched alkylamines of the number of carbon atoms specified (e.g., C1-6 alkylamino), or any number within this range [i.e., methylamino, ethylamino, isopropylamino, t-butylamino, etc.].

The term "alkylsulfonyl" refers to straight or branched chain alkylsulfones of the number of carbon atoms specified (e.g., C1-6 alkylsulfonyl), or any number within this range [i.e., methylsulfonyl ($MeSO_2^-$), ethylsulfonyl, isopropylsulfonyl, etc.].

The term "alkylsulfinyl" refers to straight or branched chain alkylsulfoxides of the number of carbon atoms specified (e.g., $C_{1-6}$ alkylsulfinyl), or any number within this range [i.e., methylsulfinyl (MeSO—), ethylsulfinyl, isopropylsulfinyl, etc.].

The term "alkyloxycarbonyl" refers to straight or branched chain esters of a carboxylic acid derivative of the present invention of the number of carbon atoms specified (e.g., $C_{1-6}$ alkyloxycarbonyl), or any number within this range [i.e., methyloxycarbonyl ($MeOCO^-$), ethyloxycarbonyl, or butyloxycarbonyl].

"Aryl" means a mono- or polycyclic aromatic ring system containing carbon ring atoms. The preferred aryls are monocyclic or bicyclic 6-10 membered aromatic ring systems. Phenyl and naphthyl are preferred aryls. The most preferred aryl is phenyl.

"Heterocyclyl" refer to saturated or unsaturated non-aromatic rings or ring systems containing at least one heteroatom selected from O, S and N, further including the oxidized forms of sulfur, namely SO and $SO_2$. Examples of heterocycles include tetrahydrofuran (THF), dihydrofuran, 1,4-dioxane, morpholine, 1,4-dithiane, piperazine, piperidine, 1,3-dioxolane, imidazolidine, imidazoline, pyrroline, pyrrolidine, tetrahydropyran, dihydropyran, oxathiolane, dithiolane, 1,3-dioxane, 1,3-dithiane, oxathiane, thiomorpholine, 2-oxopiperidin-1-yl, 2-oxopyrrolidin-1-yl, 2-oxoazetidin-1-yl, 1,2,4-oxadiazin-5(6H)-one-3-yl, and the like.

"Heteroaryl" means an aromatic or partially aromatic heterocycle that contains at least one ring heteroatom selected from O, S and N. Heteroaryls thus include heteroaryls fused to other kinds of rings, such as aryls, cycloalkyls and heterocycles that are not aromatic. Examples of heteroaryl groups include: pyrrolyl, isoxazolyl, isothiazolyl, pyrazolyl, pyridyl, oxazolyl, oxadiazolyl (in particular, 1,3,4-oxadiazol-2-yl and 1,2,4-oxadiazol-3-yl), thiadiazolyl, thiazolyl, imidazolyl, triazolyl, tetrazolyl, furyl, triazinyl, thienyl, pyrimidyl, benzisoxazolyl, benzoxazolyl, benzothiazolyl, benzothiadiazolyl, dihydrobenzofuranyl, indolinyl, pyridazinyl, indazolyl, isoindolyl, dihydrobenzothienyl, indolizinyl, cinnolinyl, phthalazinyl, quinazolinyl, naphthyridinyl, carbazolyl, benzodioxolyl, quinoxalinyl, purinyl, furazanyl, isobenzylfuranyl, benzimidazolyl, benzofuranyl, benzothienyl, quinolyl, indolyl, isoquinolyl, dibenzofuranyl, and the like. For heterocyclyl and heteroaryl groups, rings and ring systems containing from 3-15 atoms are included, forming 1-3 rings.

"Halogen" refers to fluorine, chlorine, bromine and iodine. Chlorine and fluorine are generally preferred. Fluorine is most preferred when the halogens are substituted on an alkyl or alkoxy group (e.g. $CF_3O$ and $CF_3CH_2O$).

Before describing the present invention in detail, a number of terms will be defined. As used herein, the singular forms "a", "an", and "the" include plural referents unless the context clearly dictates otherwise.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

DETAILED DESCRIPTION

Figure 1:
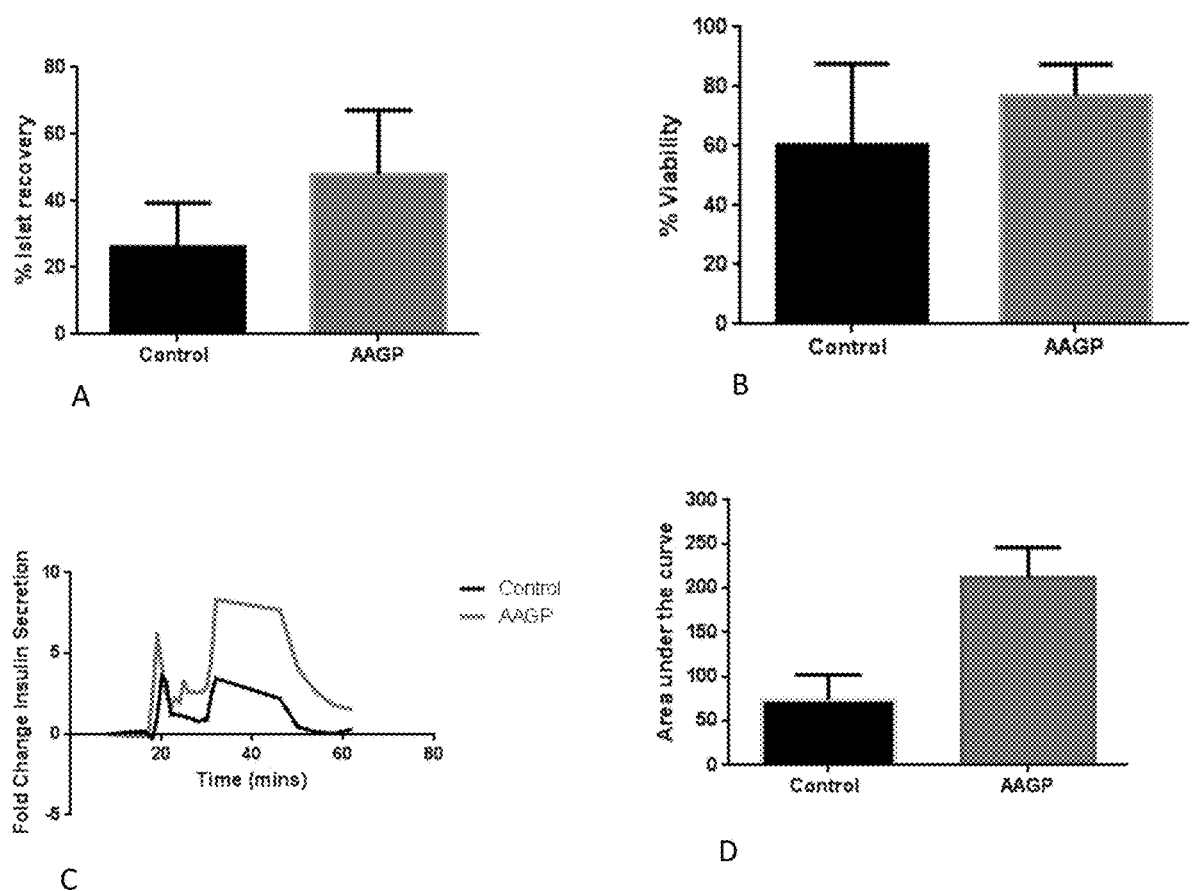
FIG. 1 illustrates the use of AAGP™ to enhance human beta cell Health. (A) Beta islet cells recovery after 24 h with or without AAGP™ (n=6 per group); (B) Beta islet cells viability (as measured with Syto® green/EB) after 24 h with or without AAGP™ (n=6 per group); and (C-D) Glucose-stimulated insulin release with or without AAGP™ (n=3 per group).
Figure 2:
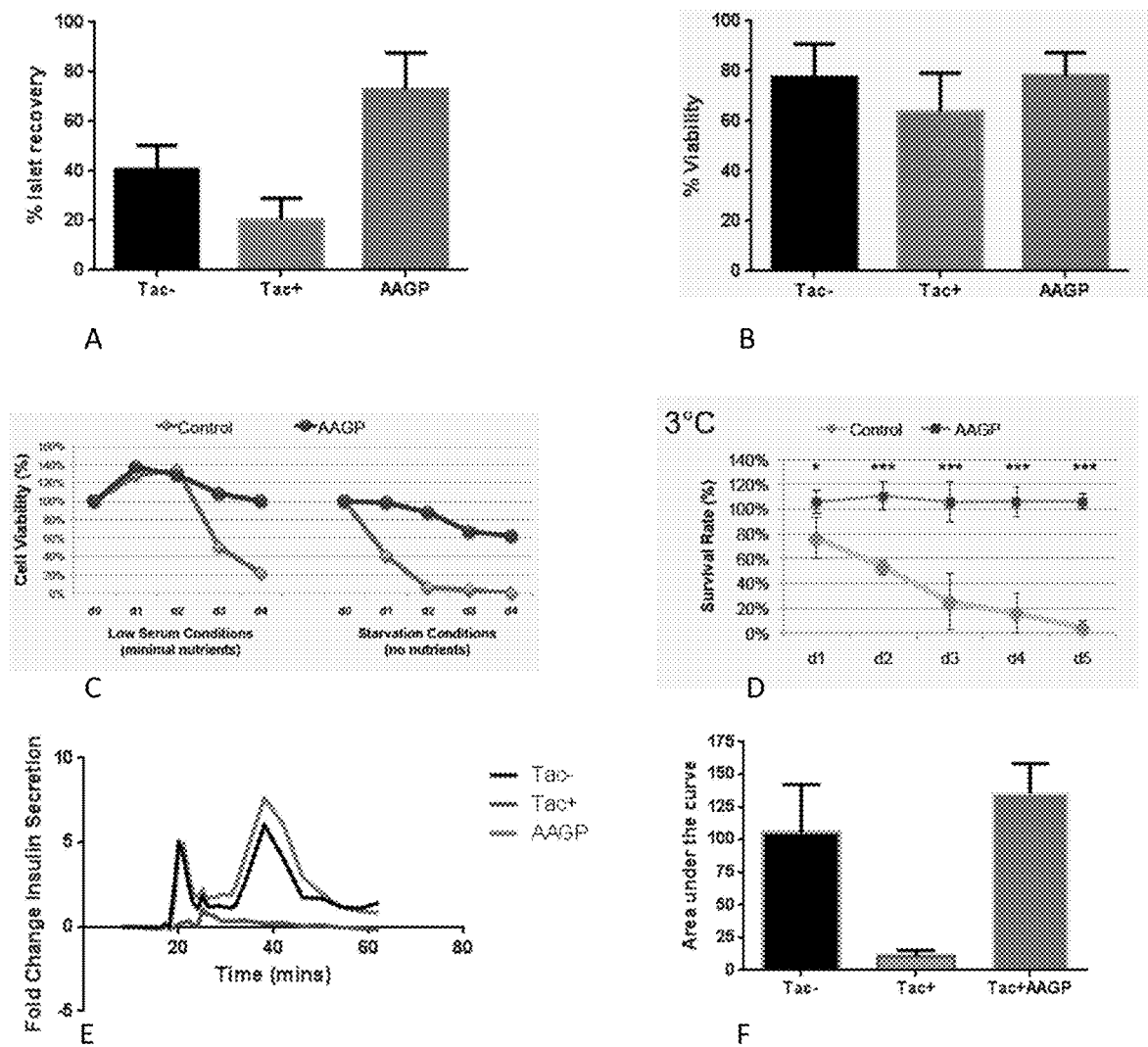
FIG. 2 illustrates the use of AAGP™ to protect human beta islet cell health Islet against tacrolimus (Tac) toxicity. (A) recovery of beta islet cells after Tac exposure with or without AAGP™ (n=6 per group), (B-D) Beta islet viability (as measured with Syto® green/EB) after Tac exposure with or without AAGP™ (n=6 per group); and (E-F) Glucose-stimulated insulin release after Tac exposure with or without AAGP™ (n=6 per group).
Figure 3:
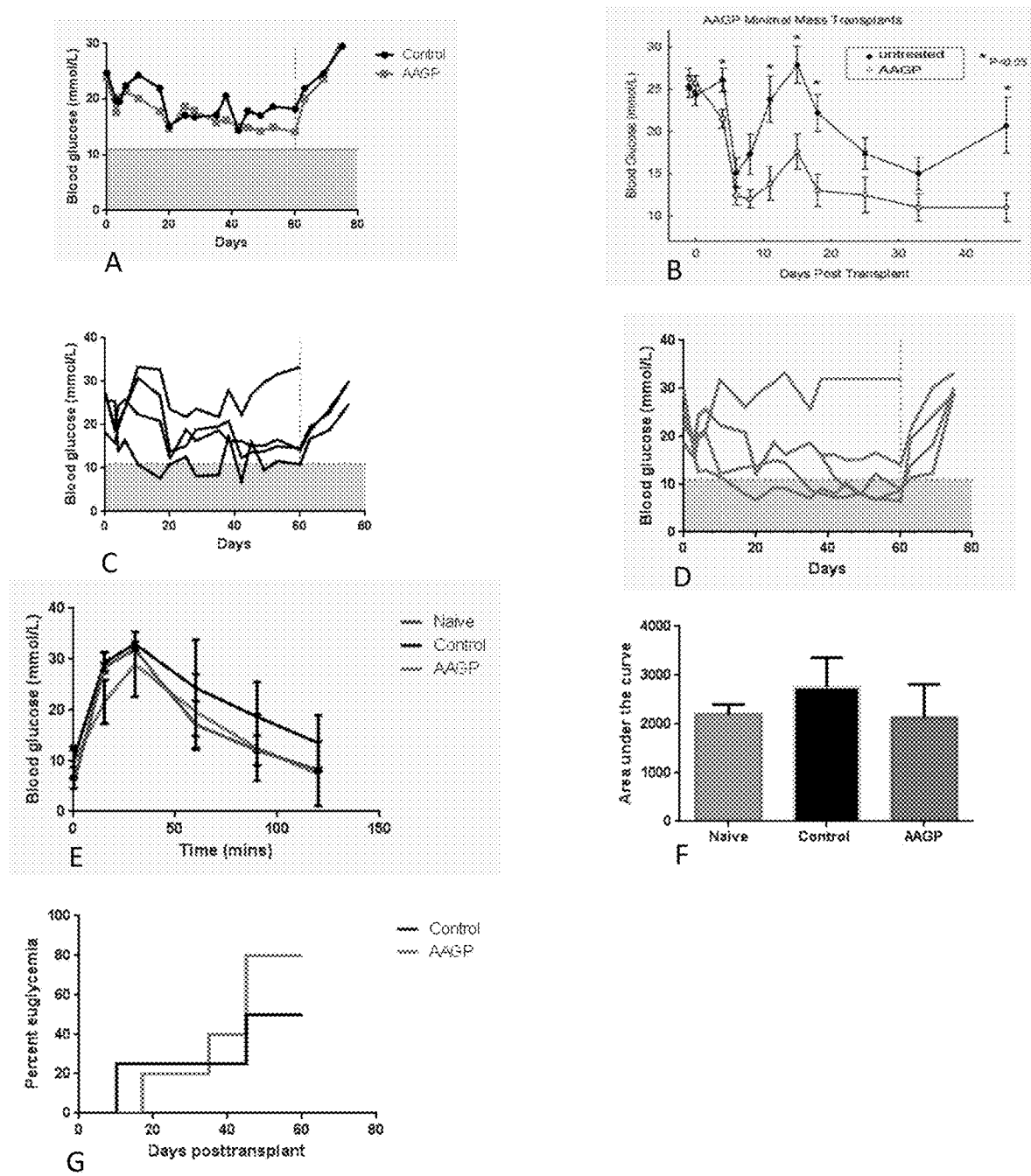
FIG. 3 illustrates the use of AAGP™ to improve transplant outcome. (A-D) Graft function after 24 h with or without AAGP™ (n=4 & 5 respectively), (E-F) Graft function after 24 h with or without AAGP™ (glucose tolerance tests) and the (G) Percent euglycemia 60 days posttransplant of beta islet cells treated with or without AAGP™ (n=4 & 5).

Beta cell transplantation is the transplantation of isolated beta islet cells from a donor pancreas into another person. It is an experimental treatment for type 1 diabetes mellitus. Once transplanted, the islet beta cells begin to produce insulin, actively regulating the level of glucose in the blood.

Islets are usually infused into the patient's liver. If the cells are not from a genetically identical donor the patient's body will recognize them as foreign and the immune system will begin to attack them as with any transplant rejection. To prevent this, immunosuppressant drugs are used. While significant progress has been made in the islet transplantation field, many obstacles remain that currently preclude its widespread application. Two of the most important limitations are the currently inadequate means for preventing islet rejection, and the limited supply of beta islet cells for transplantation. Current immunosuppressive regimens are capable of preventing beta islet cells failure for months to years, but the agents used in these treatments are expensive and may increase the risk for specific malignancies and opportunistic infections. In addition, and somewhat ironically, the most commonly used agents [including daclizumab (Zenapax™), sirolimus (Rapamune™), cyclosporine and tacrolimus (Prograf™)] are also known to impair normal beta islet cells function and/or insulin action.

In a first embodiment there is disclosed an in vitro method for enhancing engraftment of isolated pancreatic cells, isolated pancreatic progenitor cells, or both comprising the step of:
a) contacting an isolated pancreatic cell, an isolated pancreatic progenitor cell, or both prior to a transplantation in a subject in need thereof, with a gem-difluorinated C-glycopeptide compound of general formula I, or a pharmaceutically acceptable base, addition salt with an acid, hydrate or solvate of the compound of general formula I:

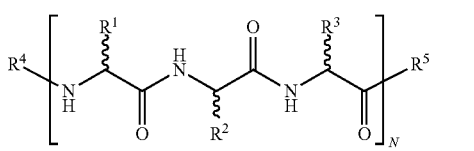

in which:

N is an integer between 1 and 5, $R^4$=H, $AA_1$, or $AA_1$-$AA_2$, $R^5$=OH, $AA_1$, or $AA_1$-$AA_2$, $AA_1$ and $AA_2$ independently represent amino acids with a non-polar side chain and $R^1$, $R^2$, $R^3$ are independent groups in which two of $R^1$, $R^2$ and $R^3$ are selected from H, $CH_3$, $CH_2Ph$, $CH(CH_3)_2$, $CH_2CH(CH_3)_2$ or $CH(CH_3)CH_2CH_3$ and the remaining $R^1$, $R^2$, $R^3$ is

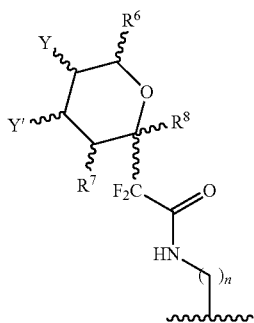

in which:

n is an integer between 3 and 4,

Y, Y' are independent groups in which Y, Y'=H, OR, $N_3$, NR'R", or SR''', where R=H, benzyl, trimethylsilyl, tert-butyldimethylsilyl, tert-butyldiphenylsilyl or acetate group, R', R" independently=H, alkyl, allyl, benzyl, tosylate group, C(=O)-alkyl or C(=O)—Bn, R'''=H, alkyl, or acetate group, $R^6$ is H, $CH_3$, $CH_2OH$, $CH_2$-glycoside group or $CH_2$—OGP in which GP is a protector group selected from alkyl, benzyl, trimethylsilyl, tert-butyldimethylsilyl, tert-butyldiphenylsilyl, or acetate group, $R^7$=OH, OGP', $NH_2$, $N_3$, NHGP' or NGP'GP" in which GP' and GP" are independently selected from alkyl, benzyl, trimethylsilyl, tert-butyldimethylsilyl, tert-butyldiphenylsilyl, or acetate group, $R^8$ is a hydrogen atom H or a free or protected alcohol function, and if $R^1$=$R^2$=H, $CH_3$, $CH_2Ph$, $CH(CH_3)_2$, $CH_2CH(CH_3)_2$, or $CH(CH_3)CH_2CH_3$ then $R^3$=

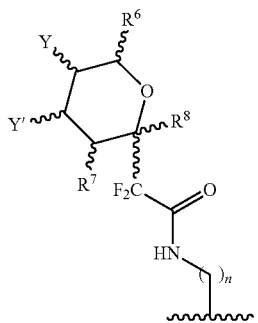

in which: n is an integer between 3 and 4,

Y, Y' are independent groups in which Y, Y'=H, OR, $N_3$, NR'R", or SR''', where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, $R^6$ is H, $CH_3$, $CH_2OH$, $CH_2$-glycoside group, or $CH_2$—OGP in which GP is a protector group selected from alkyl, benzyl, trimethylsilyl, tertbutyldimethylsilyl, tert-butyldiphenylsilyl, or acetate group, $R^7$=OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group, $R^8$ is a hydrogen atom H or a free or protected alcohol function, if $R^1$=$R^3$=H, $CH_3$, $CH_2Ph$, $CH(CH_3)_2$, $CH_2CH(CH_3)_2$, or $CH(CH_3)CH_2CH_3$ then $R^2$=

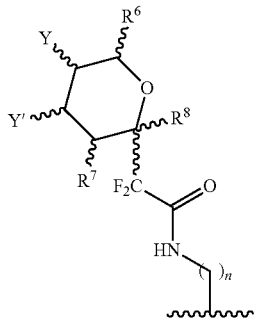

in which: n is an integer between 3 and 4,

Y, Y' are independent groups in which Y, Y'=H, OR, $N_3$, NR'R", or SR''', where R=H, benzyl, trimethylsilyl, tert-butyldimethylsilyl, tert-butyldiphenylsilyl, or acetate group, R', R" independently=H, alkyl, allyl, benzyl, tosylate group, C(=O)-alkyl, or C(=O)—Bn, R'''=H, alkyl, or acetate group, $R^6$ is H, $CH_3$, $CH_2OH$, $CH_2$-glycoside group, or $CH_2$—OGP in which GP is a protector group selected from alkyl, benzyl, trimethylsilyl, tert-butyldimethylsilyl, tert-butyldiphenylsilyl, or acetate group, $R^7$=OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group, $R^8$ is a hydrogen atom H or a free or protected alcohol function, if $R^2=R^3=$H, $CH_3$, $CH(CH_3)_2$, $CH_2CH(CH_3)_2$, or $CH(CH_3)CH_2CH_3$ then $R^1=$

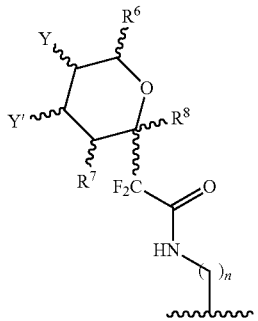

in which: n is an integer between 3 and 4,

Y, Y' are independent groups
  in which Y, Y' H, OR, $N_3$, NR'R", or SR'",
  where R=H, benzyl, trimethylsilyl, tert-butyldimethylsilyl, tert-butyldiphenylsilyl, or acetate group,
  R', R" independently=H, alkyl, allyl, benzyl, tosylate group, C(=O)-alkyl, or C(=O)—Bn,
  R'"=H, alkyl, or acetate group, $R^6$ is H, $CH_3$, $CH_2OH$, $CH_2$-glycoside group, or $CH_2$—OGP in which GP is a protector group selected from alkyl, benzyl, trimethylsilyl, tert-butyldimethylsilyl, tert-butyldiphenylsilyl, or acetate group, $R^7=$OH, OGP', $NH_2$, $N_3$, NHGP', or NGP'GP" in which GP' and GP" are independently selected from alkyl, benzyl, trimethylsilyl, tertbutyldimethylsilyl, tert-butyldiphenylsilyl, or acetate group, $R^8$ is a hydrogen atom H or a free or protected alcohol function.

According to second embodiment, there is disclosed an in vitro method for improving the insulin secretory function of isolated pancreatic beta cells prior to transplantation in a subject in need thereof, comprising the step of:
  a) contacting an isolated pancreatic beta cell with a gem-difluorinated C-glycopeptide compound of general formula I, or a pharmaceutically acceptable base, addition salt with an acid, hydrate or solvate of the compound of general formula I as described above.

According to a third, there is disclosed an in vitro method for protecting isolated pancreatic cells, isolated pancreatic progenitor cells, or both from immunosuppressant drug toxicity prior to a transplantation in a subject in need thereof comprising the step of:
  a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above.

According to a fourth embodiment, there is disclosed an in vitro method for decreasing an inflammatory response of isolated pancreatic cells, isolated pancreatic progenitor cells, or both prior to a transplantation in a subject in need thereof comprising the step of:
  a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above.

According to a fourth embodiment, there is disclosed a method of transplanting isolated pancreatic cells, isolated pancreatic progenitor cells, or both in a subject in need thereof comprising the steps of:
  a) contacting an isolated pancreatic cell, an isolated pancreatic progenitor cell, or both with a gem-difluorinated C-glycopeptide compound of general formula I, or a pharmaceutically acceptable base, addition salt with an acid, hydrate or solvate of the compound of general formula I as described above, and
  b) transplanting the treated isolated pancreatic cell of step a) in said subject in need thereof.

According to an embodiment, the method of transplanting of the present invention may further comprise step a') before step a): a') isolating pancreatic cells, pancreatic progenitor cells, or both.

According to another embodiment, the method of transplanting of the present invention may also further comprise step b') before step b): contacting the isolated pancreatic cell, the isolated pancreatic progenitor cells, or both of step a) with an immunosuppressant drug.

In embodiments, the transplantation procedure may be performed according to any know and suitable transplantation procedure, as well as future transplantation procedures that be suitably adapted to the present cell types. According to an embodiment, the transplantation procedure may be "the Edmonton protocol". The islet cell transplant procedure known as "the Edmonton protocol" involves the transplantation of cadaveric islet cell into the patient's hepatic portal vein. Due to the allogeneic nature of the transplantation, immune suppression through the use of calcineurin inhibitors such as Tacrolimus is applied. There is a period post-transplant during the engraftment process where the transplanted cells are avascular and under severe stress, it is during this period where failure to graft is likely to occur. Other sites for transplantation have that been used including sub renal capsule and sub dermal. According to embodiments, in the case of islet or beta progenitor cell transplants the primary transplant site is still the portal vein due to the large number of cells required to achieve the desired effect.

According to another embodiment, in the methods of the present invention, the isolated pancreatic cell may be an isolated alpha cell, an isolated beta cell, an isolated delta cell, an isolated gamma cell, an epsilon cell, or a combination thereof, and preferably an isolated pancreatic cell is an isolated beta cell.

In the methods of the present invention described above, the immunosuppressant drug may be one of daclizumab, sirolimus, tacrolimus, cyclosporine, or combinations thereof.

According to embodiments, subject may be a human subject, and the isolated pancreatic cell may be isolated from a live donor, a cadaveric donor, or combinations thereof.

According to an embodiment, the gem-difluorinated C-glycopeptide compound of general formula I may be a compound of general formula II:

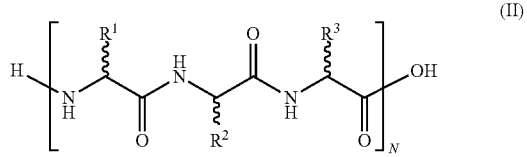

in which: N is an integer between 1 and 5,
and
$R^1$, $R^2$, $R^3$ are independent groups in which two of $R^1$, $R^2$ and $R^3$ are selected from H, $CH_3$ and the remaining $R^1$, $R^2$ and $R^3$ is

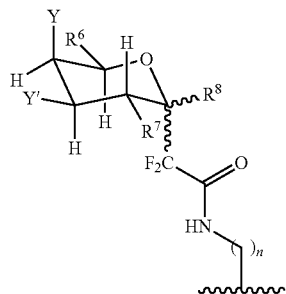

in which: n is an integer between 3 and 4,
Y, Y' are independent groups
in which Y, Y'=H, OR, $N_3$, NR'R" or SR''',
where R=H, benzyl, trimethylsilyl, tert-butyldimethylsilyl, tert-butyldiphenylsilyl, or acetate group,
R', R" independently=H, alkyl, allyl, benzyl, tosylate group, C(=O)-alkyl, or C(=O)—Bn,
R'''=H, alkyl, or acetate group,
$R^6$ is selected from H, $CH_3$, $CH_2OH$, $CH_2$—OGP in which GP is a protector group selected from alkyl, benzyl, trimethylsilyl, tert-butyldimethylsilyl, tert-butyldiphenylsilyl, or acetate group,
$R^7$=OH, OGP', $NH_2$, $N_3$, NHGP', NGP'GP" in which GP' and GP" are independently selected from alkyl, benzyl, trimethylsilyl, tert-butyldimethylsilyl, tert-butyldiphenylsilyl or acetate group,
$R^8$ is a hydrogen atom H or a free or protected alcohol function,
and
if $R^1$=$R^2$=H or $CH_3$,
then $R^3$=

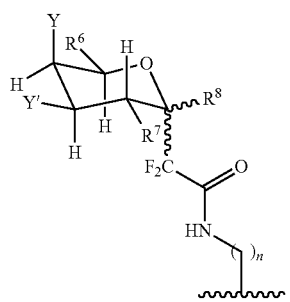

in which: n is an integer between 3 and 4,
Y, Y' are independent groups
in which Y, Y'=H, OR, $N_3$, NR'R", or SR''',
where R=H, benzyl, trimethylsilyl, tert-butyldimethylsilyl, tert-butyldiphenylsilyl, or acetate group,
R', R" independently=H, alkyl, allyl, benzyl, tosylate group, C(=O)-alkyl, or C(=O)—Bn,
R'''=H, alkyl, or acetate group,
$R^6$ is selected from H, $CH_3$, $CH_2OH$, $CH_2$—OGP in which GP is a protector group selected from alkyl, benzyl, trimethylsilyl, tert-butyldimethylsilyl, tert-butyldiphenylsilyl, or acetate group,
$R^7$=OH, OGP', $NH_2$, $N_3$, NHGP', NGP'GP" in which GP' and GP" are independently selected from alkyl, benzyl, trimethylsilyl, tert-butyldimethylsilyl, tert-butyldiphenylsilyl, or acetate group,
$R^8$ is a hydrogen atom H or a free or protected alcohol function,
if $R^1$=$R^3$=H or $CH_3$,
then $R^2$=

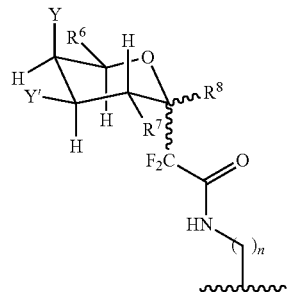

in which: n is an integer between 3 and 4,
Y, Y' are independent groups
in which Y, Y'=H, OR, $N_3$, NR'R", SR''',
where R=H, benzyl, trimethylsilyl, tert-butyldimethylsilyl, tert-butyldiphenylsilyl, or acetate group,
R', R" independently=H, alkyl, allyl,
Bn, tosylate, C(=O)-alkyl, or C(=O)—Bn,
R'''=H, alkyl, or acetate group,
$R^6$ is selected from H, $CH_3$, $CH_2OH$, or $CH_2$—OGP in which GP is a protector group selected from alkyl, benzyl, trimethylsilyl, tert-butyldimethylsilyl, tert-butyldiphenylsilyl, or acetate group,
$R^7$=OH, OGP', $NH_2$, $N_3$, NHGP', or NGP'GP" in which GP' and GP" are independently selected from alkyl, benzyl, trimethylsilyl, tert-butyldimethylsilyl, tert-butyldiphenylsilyl, or acetate group,
$R^8$ is a hydrogen atom H or a free or protected alcohol function,
if $R^2$=$R^3$=H or $CH_3$,
then $R^1$=

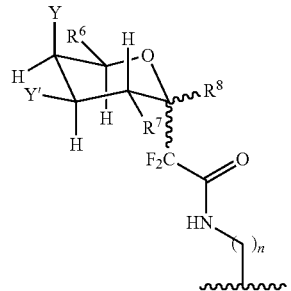

in which: n is an integer between 3 and 4,
Y, Y' are independent groups
in which Y, Y' H, OR, $N_3$, NR'R", or SR''',
where R=H, benzyl, trimethylsilyl, tert-butyldimethylsilyl, tert-butyldiphenylsilyl, or acetate group,
R', R" independently=H, alkyl, allyl, benzyl, tosylate group, C(=O)-alkyl, or C(=O)—Bn,
R'''=H, alkyl, or acetate group, R⁶ is selected from H, CH₃, CH₂OH, or CH₂—OGP in which GP is a protector group selected from alkyl, benzyl, trimethylsilyl, tert-butyldimethylsilyl, tert-butyldiphenylsilyl, or acetate group, R⁷=OH, OGP', NH₂, N₃, NHGP', or NGP'GP" in which GP' and GP" are independently selected from alkyl, benzyl, trimethylsilyl, tert-butyldimethylsilyl, tert-butyldiphenylsilyl, or acetate group, R⁸ is a hydrogen atom or a free or protected alcohol function.

According to another embodiment, a preferred gem-difluorinated C-glycopeptide compound of general formula I is a compound of formula III, also named AAGP™:

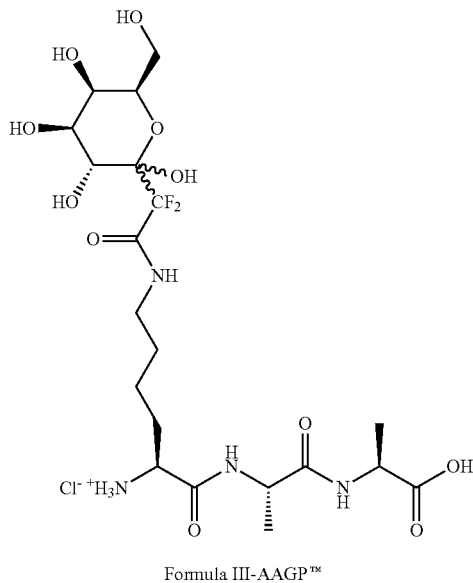

Formula III-AAGP™

According to another embodiment, there is disclosed an isolated pancreatic cell, an isolated pancreatic progenitor cell, or both prepared according to the methods of the present invention.

According to another embodiment, there is disclosed a method of transplanting isolated pancreatic cells, isolated pancreatic progenitor cells, or both in a subject in need thereof comprising the steps of:
a) transplanting an isolated pancreatic cell, an isolated pancreatic progenitor cell, or both prepared according to the method of the present invention, in said subject in need thereof.

According to another embodiment, there is disclosed a method of treating diabetes comprising the step of:
a) transplanting an isolated pancreatic cell, an isolated pancreatic progenitor cell, or both prepared according to the method of the present invention, in said subject in need thereof.

According to another embodiment, the isolated pancreatic cell may be an isolated alpha cell, an isolated beta cell, an isolated delta cell, an isolated gamma cell, an epsilon cell, or a combination thereof, and preferably an isolated pancreatic cell is an isolated beta cell.

According to another embodiment, there is disclosed a use of an isolated pancreatic cell, an isolated pancreatic progenitor cell, or both prepared according to the method of the present invention, for transplantation to a subject in need thereof.

According to another embodiment, there is disclosed a use of an isolated pancreatic cell, an isolated pancreatic progenitor cell, or both prepared according to the method of the present invention, for treatment of diabetes in a subject in need thereof.

According to another embodiment, there is disclosed an isolated pancreatic cell prepared, an isolated pancreatic progenitor cell, or both according to the method of the present invention, for transplantation to a subject in need thereof.

According to another embodiment, the isolated pancreatic cell may be an isolated alpha cell, an isolated beta cell, an isolated delta cell, an isolated gamma cell, an epsilon cell, or a combination thereof, and preferably an isolated pancreatic cell is an isolated beta cell.

According to another embodiment, there is disclosed an isolated pancreatic cell, an isolated pancreatic progenitor cell, or both contacted with a gem-difluorinated C-glycopeptide compound of general formula I, or a pharmaceutically acceptable base, addition salt with an acid, hydrate or solvate of the compound of general formula I as described above.

According to another embodiment, there is disclosed a use of a gem-difluorinated C-glycopeptide compound of general formula I as described above, or a pharmaceutically acceptable base, addition salt with an acid, hydrate or solvate of the compound of general formula I as described above, for enhancing engraftment of isolated pancreatic cells, isolated pancreatic progenitor cells, or both in a subject in need thereof.

According to another embodiment, there is disclosed a use of a gem-difluorinated C-glycopeptide compound of general formula I as described above, or a pharmaceutically acceptable base, addition salt with an acid, hydrate or solvate of the compound of general formula I as described above, for improving the insulin secretory function of isolated pancreatic beta cells, isolated pancreatic progenitor cells, or both prior to transplantation in a subject in need thereof.

According to another embodiment, there is disclosed a use of a gem-difluorinated C-glycopeptide compound of general formula I as described above, or a pharmaceutically acceptable base, addition salt with an acid, hydrate or solvate of the compound of general formula I as described above, for protecting isolated pancreatic cells, isolated pancreatic progenitor cells, or both from immunosuppressant drug toxicity prior to a transplantation in a subject in need thereof.

According to another embodiment, there is disclosed a use of a gem-difluorinated C-glycopeptide compound of general formula I as described above, or a pharmaceutically acceptable base, addition salt with an acid, hydrate or solvate of the compound of general formula I as described above, for decreasing an inflammatory response of isolated pancreatic cells, isolated pancreatic progenitor cells, or both prior to a transplantation in a subject in need thereof.

According to another embodiment, there is disclosed a gem-difluorinated C-glycopeptide compound of general formula I as described above, or a pharmaceutically acceptable base, addition salt with an acid, hydrate or solvate of the compound of general formula I as described above, for use in enhancing engraftment of isolated pancreatic cells, isolated pancreatic progenitor cells, or both in a subject in need thereof.

According to another embodiment, there is disclosed a gem-difluorinated C-glycopeptide compound of general formula I as described above, or a pharmaceutically acceptable base, addition salt with an acid, hydrate or solvate of the compound of general formula I as described above, for use in improving the insulin secretory function of isolated pancreatic beta cells, isolated pancreatic progenitor cells, or both prior to transplantation in a subject in need thereof:

According to another embodiment, there is disclosed a gem-difluorinated C-glycopeptide compound of general formula I as described above, or a pharmaceutically acceptable base, addition salt with an acid, hydrate or solvate of the compound of general formula I as described above, for use in protecting isolated pancreatic cells, isolated pancreatic progenitor cells, or both from immunosuppressant drug toxicity prior to a transplantation in a subject in need thereof:

According to another embodiment, there is disclosed a use of a gem-difluorinated C-glycopeptide compound of general formula I as described above, or a pharmaceutically acceptable base, addition salt with an acid, hydrate or solvate of the compound of general formula I as described above, for use in decreasing an inflammatory response of isolated pancreatic cells, isolated pancreatic progenitor cells, or both prior to a transplantation in a subject in need thereof:

According to another embodiment, the compound of formula I may be a compound of formula II and/or a compound of formula III:

According to another embodiment, the isolated pancreatic cell, isolated pancreatic progenitor cell, or both may be contacted with from about from about 0.01 mg/ml to about 5 mg/ml of said compound of formula I, formula II or formula III, or from about 1 mg/ml to about 5 mg/ml of said compound of formula I, formula II or formula III.

In the use of the present invention described above, the immunosuppressant drug may be one of daclizumab, sirolimus, tacrolimus, cyclosporine, or combinations thereof.

According to use and compounds described above, the subject may be a human subject, and the isolated pancreatic cell may be isolated from a live donor, a cadaveric donor, or combinations thereof.

According to another embodiment, the isolated pancreatic cell may be an isolated alpha cell, an isolated beta cell, an isolated delta cell, an isolated gamma cell, an epsilon cell, or a combination thereof, and preferably an isolated pancreatic cell is an isolated beta cell.

The invention includes the compounds as shown, and also includes (where possible) individual diastereomers, enantiomers, and epimers of the compounds, and mixtures of diastereomers and/or enantiomers thereof including racemic mixtures. Although the specific stereochemistries disclosed herein are preferred, other stereoisomers, including diastereomers, enantiomers, epimers, and mixtures of these may also be useful. Inactive or less active diastereoisomers and enantiomers are useful for scientific studies relating to the targets and/or the mechanism of activation.

The compounds disclosed herein may be used in pharmaceutical compositions comprising (a) the compound(s) or pharmaceutically acceptable salts thereof, and (b) a pharmaceutically acceptable carrier. The compounds may be used in pharmaceutical compositions that include one or more other active pharmaceutical ingredients. The compounds may also be used in pharmaceutical compositions in which the compound of Formula I, II or III, or a pharmaceutically acceptable salt thereof is the only active ingredient.

Compounds of structural Formula I, structural Formula II and/or structural Formula III may contain one or more asymmetric centers and can thus occur as racemates and racemic mixtures, single enantiomers, diastereomeric mixtures and individual diastereomers. The present invention is meant to comprehend all such isomeric forms of the compounds of structural Formula I, structural Formula II and/or structural Formula III.

Compounds of structural Formula I, structural Formula II and/or structural Formula III may be separated into their individual diastereoisomers by, for example, fractional crystallization from a suitable solvent, for example methanol or ethyl acetate or a mixture thereof, or via chiral chromatography using an optically active stationary phase. Absolute stereochemistry may be determined by X-ray crystallography of crystalline products or crystalline intermediates which are derivatized, if necessary, with a reagent containing an asymmetric center of known absolute configuration.

Alternatively, any stereoisomer of a compound of the general structural Formula I, structural Formula II and/or structural Formula III may be obtained by stereospecific synthesis using optically pure starting materials or reagents of known absolute configuration.

If desired, racemic mixtures of the compounds may be separated so that the individual enantiomers are isolated. The separation can be carried out by methods well known in the art, such as the coupling of a racemic mixture of compounds to an enantiomerically pure compound to form a diastereomeric mixture, followed by separation of the individual diastereomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art.

Some of the compounds described herein contain olefinic double bonds, and unless specified otherwise, are meant to include both E and Z geometric isomers.

Some of the compounds described herein may exist as tautomers, which have different points of attachment of hydrogen accompanied by one or more double bond shifts. For example, a ketone and its enol form are keto-enol tautomers. The individual tautomers as well as mixtures thereof are encompassed with compounds of the present invention.

In the compounds of generic Formula I, Formula II and/or Formula III, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of generic Formula I, Formula II and/or Formula III. For example, different isotopic forms of hydrogen (H) include protium ($^1$H) and deuterium ($^2$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds within generic Formula I, Formula II and/or Formula III can be prepared without undue experimentation by conventional techniques well known to those skilled in the art.

Salts and Formulations

It will be understood that, as used herein, references to the compounds of structural Formula I, Formula II and/or Formula III are meant to also include the pharmaceutically acceptable salts, and also salts that are not pharmaceutically acceptable when they are used as precursors to the free compounds or their pharmaceutically acceptable salts or in other synthetic manipulations. The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, benzenesulfonate, benzoate, bicarbonate, bisulfate, bitartrate, borate, bromide, camsylate, carbonate, chloride, clavulanate, citrate, edetate, edisylate, estolate, esylate, fumarate, gluceptate, gluconate, glutamate, hexylresorcinate, hydrobromide, hydrochloride, hydroxynaphthoate, iodide, isothionate, lactate, lactobionate, laurate, malate, maleate, mandelate, mesylate, methylbromide, methylnitrate, methylsulfate, mucate, napsylate, nitrate, N-methylglucamine ammonium salt, oleate, oxalate, pamoate (embonate), palmitate, pantothenate, phosphate/diphosphate, polygalacturonate, salicylate, stearate, sulfate, subacetate, succinate, tannate, tartrate, teoclate, tosylate, triethiodide and valerate. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Particularly preferred are the ammonium, calcium, magnesium, potassium, and sodium salts. Salts derived from pharmaceutically acceptable organic non-toxic bases include salts of primary, secondary, and tertiary amines, cyclic amines, and basic ion-exchange resins, such as arginine, betaine, caffeine, choline, N,N-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, isopropylamine, lysine, methylglucamine, morpholine, piperazine, piperidine, polyamine resins, procaine, purines, theobromine, triethylamine, trimethylamine, tripropylamine, tromethamine, and the like.

Also, in the case of a carboxylic acid (—COOH) or alcohol group being present in the compounds of the present invention, pharmaceutically acceptable esters of carboxylic acid derivatives, such as methyl, ethyl, or pivaloyloxymethyl, or acyl derivatives of alcohols, such as acetyl, pivaloyl, benzoyl, and aminoacyl, can be employed. Included are those esters and acyl groups known in the art for modifying the solubility or hydrolysis characteristics for use as sustained-release or prodrug formulations.

Solvates, in particular hydrates, of the compounds of structural Formula I, Formula II and/or Formula III are included in the present invention as well.

According to an embodiment, the compounds of structural Formula I, Formula II and/or Formula III may be included in various formulations for use as medicaments.

Aqueous suspensions contain the active material in admixture with excipients suitable for the manufacture of aqueous suspensions. Such excipients are suspending agents, for example sodium carboxymethyl-cellulose, methylcellulose, hydroxypropylmethy-cellulose, sodium alginate, polyvinyl-pyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethylene-oxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl, p-hydroxybenzoate, one or more coloring agents, one or more flavoring agents, and one or more sweetening agents, such as sucrose, saccharin or aspartame.

Oily suspensions may be formulated by suspending the active ingredient in a vegetable oil, for example arachis oil, olive oil, sesame oil or coconut oil, or in mineral oil such as liquid paraffin. The oily suspensions may contain a thickening agent, for example beeswax, hard paraffin or cetyl alcohol. Sweetening agents such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of an oil-in-water emulsion. The oily phase may be a vegetable oil, for example olive oil or arachis oil, or a mineral oil, for example liquid paraffin or mixtures of these. Suitable emulsifying agents may be naturally-occurring phosphatides, for example soy bean, lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening and flavouring agents.

The pharmaceutical compositions may be in the form of a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

According to an embodiment, the cells are isolated using methods known in the art for their preparation. For example, the cells may be isolated from donors (live or cadaveric donors) using mixtures of enzymes such as Collagenase I and Collagenase II, Thermolysin, non-clostridial neutral protease, or other enzymes being used for such purpose. The isolated cells may then be cultured under normal tissue culture conditions in standard tissue culture flasks.

According to an embodiment, the cells, pancreatic progenitor cells, or both may be treated with a gem-difluorinated C-glycopeptide compound of general formula I—preferably, the compound of Formula II, and most preferably the compound of formula III in concentrations varying from about 0.01 mg/ml to about 5 mg/ml; or from about 0.1 mg/ml to about 5 mg/ml; or from about 0.5 mg/ml to about 5 mg/ml; or from about 1 mg/ml to about 5 mg/ml; or from about 3 mg/ml to about 5 mg/ml; or from about 0.01 mg/ml to about 3 mg/ml, or from about 0.1 mg/ml to about 3 mg/ml, or from about 0.5 mg/ml to about 3 mg/ml, or from about 1 mg/ml to about 3 mg/ml, or from about 0.01 mg/ml to about 1 mg/ml; or from about 0.1 mg/ml to about 1 mg/ml; or from about 0.5 mg/ml to about 1 mg/ml; or from about 0.01 mg/ml to about 0.5 mg/ml; or from about 0.1 mg/ml to about 0.5 mg/ml; or from about 0.01 mg/ml to about 0.1 mg/ml; or about 3 mg/ml. According to embodiments, the amounts above are considered to be therapeutically effective amounts for the purpose of the present inventions.

According to another embodiment, the cells are contacted with the gem-difluorinated C-glycopeptide compound for a time sufficient to effect improvements on cell viability and survival rate. According to embodiments, the time sufficient may be from about 12 hours to 120 hours, or from about 12 hours to about 96 hours, or from about 12 hours to about 72 hours, or from about 12 hours to about 48 hours, or from about 12 hours to about 24 hours, or about 120 hours, or about 96 hours, or about 72 hours, or about 48 hours, or about 24 hours, or about 12 hours.

In another embodiment there is disclosed a cell preparation prepared according to the method of the present invention, in a pharmaceutically acceptable carrier. According to an embodiment, the cell preparation may be used for the preparation of a medicament for a cell transplantation. According to another embodiment, the cell preparation may be used for a cell transplantation.

In another embodiment, there is disclosed a method of transplantation comprising transplanting a cell preparation of the present invention to a subject in need thereof. The subject may be a mammal, and preferably a human.

The present invention will be more readily understood by referring to the following examples which are given to illustrate the invention rather than to limit its scope.

Example 1

Utilizing AAGP™ to Enhance Human Beta Cell Health Initial Characterization

Experiment Methodology

Research-grade human islet preparations are cultured for 24 hours in the following groups:
1) AAGP™ supplemented islets cells; and
2) Controls (non-supplemented islets cells).

Islets are cultured in humidified atmosphere of 95% air and 5% $CO_2$ at 37° C., at a density of 200 IE/mL using standard tissue culture flask. The AAGP™ concentration is 3 mg/mL. Several tests are conducted on day 1 post-islet isolation, including: Islet recovery, membrane integrity viability stain (Syto® EB) as well as Glucose-Stimulated Insulin Release. The results are shown in FIGS. 1A-D.

Example 2

Utilizing AAGP™ to Protect Human Beta Cells from Tacrolimus Toxicity

Experiment Methodology

Research-grade human islet preparations are cultured for 48 hours in the following groups:
1) No tacrolimus (Tac−) treated beta islet cells;
2) Tracrolimus (Tac+) treated beta islet cells; and
3) Tacrolimus (Tac+) treated+AAGP™ supplementation beta islet cells.

After 48 h, tacrolimus (long/L) was added to group 2 and 3.

Islets are cultured in humidified atmosphere of 95% air and 5% $CO_2$ at 37° C., at a density of 200 IE/mL using standard tissue culture flask. AAGP™ concentration is 3 mg/mL. Several tests are conducted on D1 post-islet isolation, including: Islet recovery, membrane integrity viability stain (Syto EB) as well as Glucose-stimulated Insulin Release. The results are shown in FIGS. 2A-F.

Example 3

Utilizing Anti-Aging Glyco-Peptides to Improve Transplant Outcome

Experiment Methodology

Two research-grade human islet preparations are cultured for 24 hours in the following groups:
1) AAGP™+ supplemented islets cells; and
2) Control (non-supplemented islets)

Islets are cultured in humidified atmosphere of 95% air and 5% $CO_2$ at 37° C., at a density of 200 IE/mL using standard tissue culture flask. AAGP™ concentration is 3 mg/mL. After 24 h, kidney subcapsular islet transplant is performed on immunodeficient mice (Rag1) with minimal islet mass (~1000 IEQ) to assess transplant efficacy (n=4 & 5, control and AAGP™ respectively). The results are shown in FIGS. 3A-G.

Conclusion

The AAGP™ formulation shows no toxicity on human islet cells.

AAGP™ seems to enhance islet survival in culture.

AAGP™ protects islet exposed to tacrolimus in vitro.

Transplant studies with minimal islet mass were inconclusive, although AAGP™ seems to provide an advantage to transplanted islets Example 4

Islet Isolation and Purification

Human islets are used in all experiments. Islets are isolated from deceased donors in the clinical Good Manufacturing Practice (GMP) facility within the Clinical Islet Transplant Program, University of Alberta. Briefly, pancreata are procured from multiorgan deceased donors and preserved in histidine-tryptophan-ketoglutarate (HTK, Custodiol. Metapharm, Brandford, ON, Canada) solution or Static Preservation Solution (SPS-1, Itasca, IL, USA). The gland is then distended with Liberase MTF C/T GMP (Roche Diagnostics GmbH, Manheim Germany), supplemented with Clzyme Collagenase and Clzyme Thermolysin (Vitacyte LLP, Indianapolis, IN, USA) and digested in a Ricordi chamber. Free islets are further purified on a cell processor (Model 2991; Cobe Laboratories, Lakewood, CO, USA) using continuous density gradient centrifugation (Islet isolation for clinical transplantation. In: Shahidul. M, (ed). The islets of Langerhans. New York: Springer, 2010).

Example 5

In Vitro Evaluation

Islets are counted with dithizone staining (3 mg/mL final concentration, Sigma-Aldrich, ON, Canada) using an optical graticule at the beginning and end of culture. The total number of islets is converted to Islet Equivalents (IEQ) (standardized to a diameter of 150 μm) (Islet isolation for clinical transplantation. In: Shahidul. M, (ed). The islets of Langerhans. New York: Springer, 2010; and Ranuncoli A, et al. Cell transplantation 2000; 9(3):409-414).

For the initial characterization islets from three different preparations are divided in two groups and cultured in media (CMRL-1066, Mediatech, Manassas, VA, USA) supplemented with 10% fetal bovine serum, L-glutamine (100 mg/l), penicillin (112 kU/l), streptomycin (112 mg/l) and HEPES (25 mmol/l); pH 7.4 with NaOH at 37° C., 5% $CO_2$, and saturated humidity. One group is also supplemented with AAGP™ at 3 mg/mL (ProtoKinetix), a synthetic analog of AFP. AAGP™ is highly soluble in all media and has proven to be more stable while retaining high bioactive properties comparable to natural AFP. The other group served as control.

After 24 hr of culture, islets are assessed for recovery, viability and function. Recovery rate is calculated as the percentage of surviving islets after 24 hr culture in comparison to the initial count for each condition. Viability is assessed using a fluorescent membrane integrity assay with counter-stains syto green/ethidium bromide (Cedarlane Laboratories, Burlington, ON, and Sigma-Aldrich, ON) (Islet isolation for clinical transplantation. In: Shahidul. M, (ed). The islets of Langerhans. New York: Springer, 2010; Ranuncoli A, et al. Cell transplantation 2000; 9(3):409-414; Ricordi C. et al. Acta diabetologica latina 1990; 27(3):185-195; and Barnett M J et al. Cell transplantation 2004; 13(5):481-488).

Islet secretory function is assessed by monitoring in vitro insulin secretory profile during continuous glucose stimulation, as described by Cabrera et al Cell transplantation 2008;16(10):1039-1048. This in vitro perifusion assay is a modality of continuous Glucose-Stimulated Insulin Secretion (GSIS) test to stress islets in alternating normoglycemic and hyperglycemic environment to model physiological islet response. Supernatants from the perifusion assay are collected and insulin levels are determined using a commercially available ELISA kit (Insulin ELISA kit. Mercodia Inc. Pittsburgh, PA, USA). Results are expressed as fold-change of insulin secretion compared to the low (2.8 mMol) glucose stimulation baseline, normalized for 100 IEQ.

Example 6

Tacrolimus Toxicity

The cytoprotective capabilities of AAGP™ are evaluated against tacrolimus-induced toxicity (Johnson J D et al, Cell transplantation 2009;18(8):833-845). Islets from six different research-grade human preparations are separated into three groups: one AAGP™-supplemented group and two nFon-supplemented controls. Islets are kept in similar culture conditions for 24 hr followed by the addition of tacrolimus (Prograf, Astellas Pharma Canada Inc., Markham, ON, Canada) in the AAGP™ group and in one of the control groups (positive control). Tacrolimus is added to the culture media at a concentration of 10 ng/mL, a clinically relevant dose, and all groups are cultured for an additional 24 hr, followed by perifusion and determination of pro-inflammatory cytokines, oxidative stress and apoptosis. The results are presented in Figs. ??.

Example 7

Pro-Inflammatory Cytokines and Chemokines

After 24 hr exposure to tacrolimus, samples from culture media of all groups are frozen and relevant cytokines and chemokines (IFN-γ, IL-1β, IL-6, IL-10, IL-12, Keratinocyte-derived Chemokine (KC), and TNF-α) are measured using a Multi-Spot Human ProInflammatory 7-Plex Ultra-Sensitive kit (Meso Scale Discovery®, Gaithersburg, MD, USA), analyzed on the SECTOR™ Imager (Meso Scale Discovery®, Gaithersburg, MD, USA). Results are expressed as absolute values (pg/mL), and CMRL culture media alone is used as a control for comparison.

Example 8

Ros Analysis

Frozen samples from all groups are utilized to determine reactive oxygen species (ROS) in the culture media, using the Acridan Lumigen™ PS-3 assay (Amershan ECL Plus kit, Fisher Scientific Inc. Ottawa, ON, Canada) (18). In this assay Acridan Lumigen™ PS-3 is excited by reactive oxygen and nitrogen species (RNS) in the presence of hydrogen peroxide, producing chemiluminescense at 430 nm. Media samples are flash-frozen with liquid nitrogen and stored until the assay is performed. CMRL culture media alone is used as a control, and results are expressed as fold-change increase compared to the control media.

Example 9

Apoptosis Analysis

Apoptosis is measured in all groups using a cleaved caspase-3 spectrophotometric assay and Terminal deoxynucleotidyl transferase dUTP nick end labeling (TUNEL) staining. All determinations are made on normalized groups of 100 IEQ and their corresponding culture media.

Frozen media samples are used to determine cleaved caspase-3 increase using a spectrophotometric assay (EMD Millipore™. Billerica, MA, USA). Again, CMRL culture media alone with additives and no cells is used as a control, and results are expressed as fold-change increase compared to the control media.

For TUNEL staining (DeadEnd™ Apoptosis Detection System, Promega, Madison, WI), islets are fixed in formalin, processed and embedded in paraffin. Co-staining is performed to identify the graft (insulin), apoptotic cells and all nuclei present in the field. Apoptosis is quantified by percentage of positive TUNEL stained area using imageJ software.

Example 10

Transplant

Eight to 12 week immunodeficient mice (B6.129S7-$Rag1^{tm1Mom}$) are obtained from the Jackson Laboratory (Bar Harbor, ME, USA) and housed under specific pathogen-free conditions with access to food and water ad libitum. Animals are cared for according to the guidelines of the Canadian Council on Animal Care, and ethical approval is obtained from the animal welfare committee at the University of Alberta.

Diabetes is chemically induced by intraperitoneal injection of streptozotocin (STZ, Sigma-Aldrich, ON, Canada) at a dose of 180 mg/kg. Animals are considered diabetic after two consecutive blood glucose measurements are documented≥18 mmol/L.

Ten animals per group received approximately 1,000 IEQ human islets transplanted under the capsule of the left kidney as described previously (19).

Example 11

Transplant Nephrectomy at 24 Hours

Three mice per group underwent nephrectomy and are euthanized 24 hr post-transplant to perform acute determination of proinflammatory cytokines, cleaved capase-3 and TUNEL in the graft area. In all cases the islet graft is excised from the kidney, weighed, flash frozen in liquid nitrogen and stored at −80° C. Tissue samples are subsequently lysed using 1 ml of lysis buffer (0.15 M NaCl, 1 mM Tris-HCL, 0.1% SDS, 0.1% Triton X-100, 20 mM Sodium deoxycholate, 5 mM EDTA) per 200 mg of tissue. Lysates are then homogenized (PowerGen, Fisher Scientific, ON, Canada) on ice for 30 sec×2 replications, and sonicated (VirSonic, VirTis, NY, USA) with 10 quick pulses while on ice. Cellular debris is pelleted by centrifugation at 14,000 rpm for 10 min at 4° C. and the resulting supernatant is collected and placed in a microcentrifuge tube containing 10 µl of a protease inhibitor cocktail (Sigma-Aldrich Canada Co., Oakville, ON, Canada) per 1 ml of lysate (1:100).

Graft samples are assayed (using the corresponding mouse kit) for pro-inflammatory cytokines/chemokines, caspase-3 and TUNEL staining, as previously described. All determinations are adjusted per gram of tissue.

Example 12

Long-Term Graft Function

Non-fasting blood glucose is monitored in the remaining 7 mice per group three times a week using a portable glucometer (OneTouch Ultra 2, LifeScan, Canada) over 60 days. Normoglycemia is defined when two consecutive readings are below 11.3 mmol/L.

Intraperitoneal Glucose-Tolerance Tests (IPGTT) are conducted 60 days post-transplant to evaluate the capacity of islets to respond to a glucose bolus (3 g/kg) after overnight fast. Blood glucose levels are monitored at baseline (Time 0, 15, 30, 60, 90 and 120 minutes post-injection). All results are compared to blood glucose profiles of naive control mice.

Recovery nephrectomies are performed on day 65 on all animals to demonstrate graft-dependent euglycemia. Non-fasting blood glucose levels are recorded for 1 week following nephrectomy. Likewise, the native pancreas is excised at the terminal endpoint, fixed in 10% formalin and analyzed with immunohistochemistry to confirm absence of mouse insulin staining, thus, eliminating residual or regeneration of native pancreatic beta cell function.

Preserved grafts are then processed as previously described and residual insulin content is determined using human insulin ELISA as a measure of surviving islets.

Example 13

Statistical Analysis

Data are represented as means±standard error of the mean (SEM). Area under the curve is calculated for GSIS and IPGTT and differences between groups are analyzed with one-way ANOVA and Tukey's post-hoc test. A p-value<0.05 is considered significant and all the analysis is performed using GraphPad Prism (GraphPad Software, La Jolla, CA, USA).

Example 14

AAGP™ Enhances Preservation of Islets in Culture

Isolated human islets from 3 different preparations are cultured for 24 hr in media supplemented with or without AAGP™ to evaluate islet mass preservation and changes in function. Islets are counted after 24 hr of culture resulting in a significant difference in islet recovery. A greater number of surviving islets as observed in the AAGP™-supplemented group (76.62±7.4% vs. 50.63±6.2%, p=0.029) (FIG. 4A), although there are no differences in cellular viability as per membrane integrity assay (data not shown).

Figure 4:
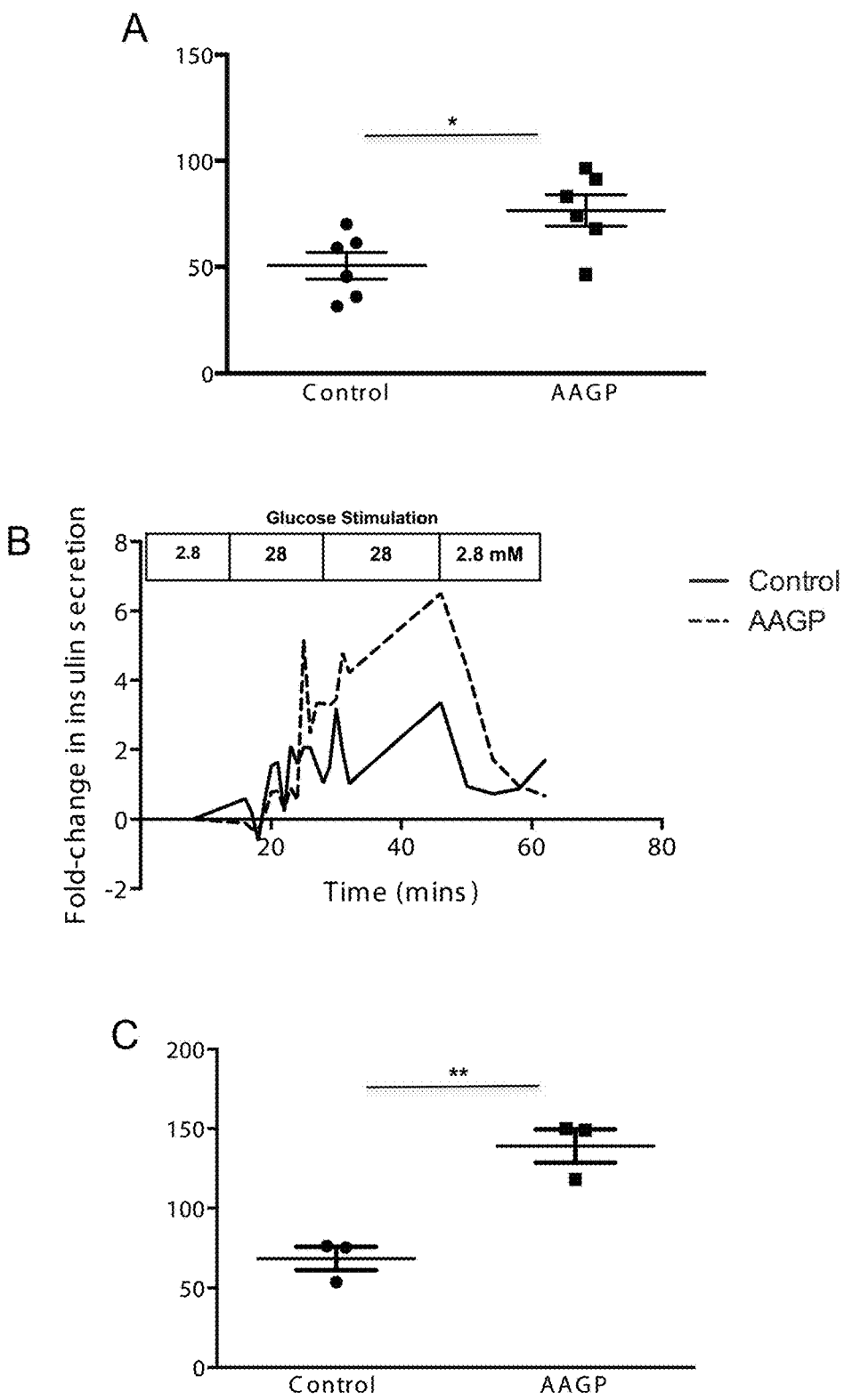
FIG. 4 illustrates the in vitro assessment of human islets in culture with or without AAGP™ supplementation. A. Differences in islet recovery rate after 24 h of culture (p=0.02). B. Functional assessment with perifusion curves comparing glucose-stimulated insulin secretion (GSIS). C. Differences in area under the curve corresponding to the perifusion curves. Data points represent mean±SEM, n=3, *P<0.05, *p<0.001 and **p<0.0001.

When comparing in vitro function (GSIS) of these two groups a significant increase in insulin secretion from AAGP™-supplemented islets is observed during the second secretory phase, as shown in the perifusion curves (p<0.001) (FIG. 4B). The resulting area under the curve confirmed overall increased insulin release from AAGP™-supplemented islets (AUC, 149.5±0.5 vs. 75.5±0.5, p<0.001) (FIG. 4C).

Example 15

AAGP™ Effectively Protect Islets Against Tacrolimus-Related Injury

Based on known diabetogenic effects of calcineurin inhibitors (CNI) and in particular, tacrolimus, a toxicity islet assay is performed and cytoprotective capabilities of AAGP™ are evaluated. Again, isolated human islets from 6 different preparations are cultured for 24 h in media supplemented with or without AAGP™, followed by 24 hr exposure to tacrolimus at a clinically relevant dose of 10 ng/mL. To examine the cytoprotective effect of AAGP™, islets are cultured in the presence of culture media only (Tac−), tacrolimus only (Tac+) or AAGP™ with tacrolimus (Tac+ AAGP™). After the defined culture period all groups are characterized for in vitro survival, viability, function and oxidative stress.

Figure 5:
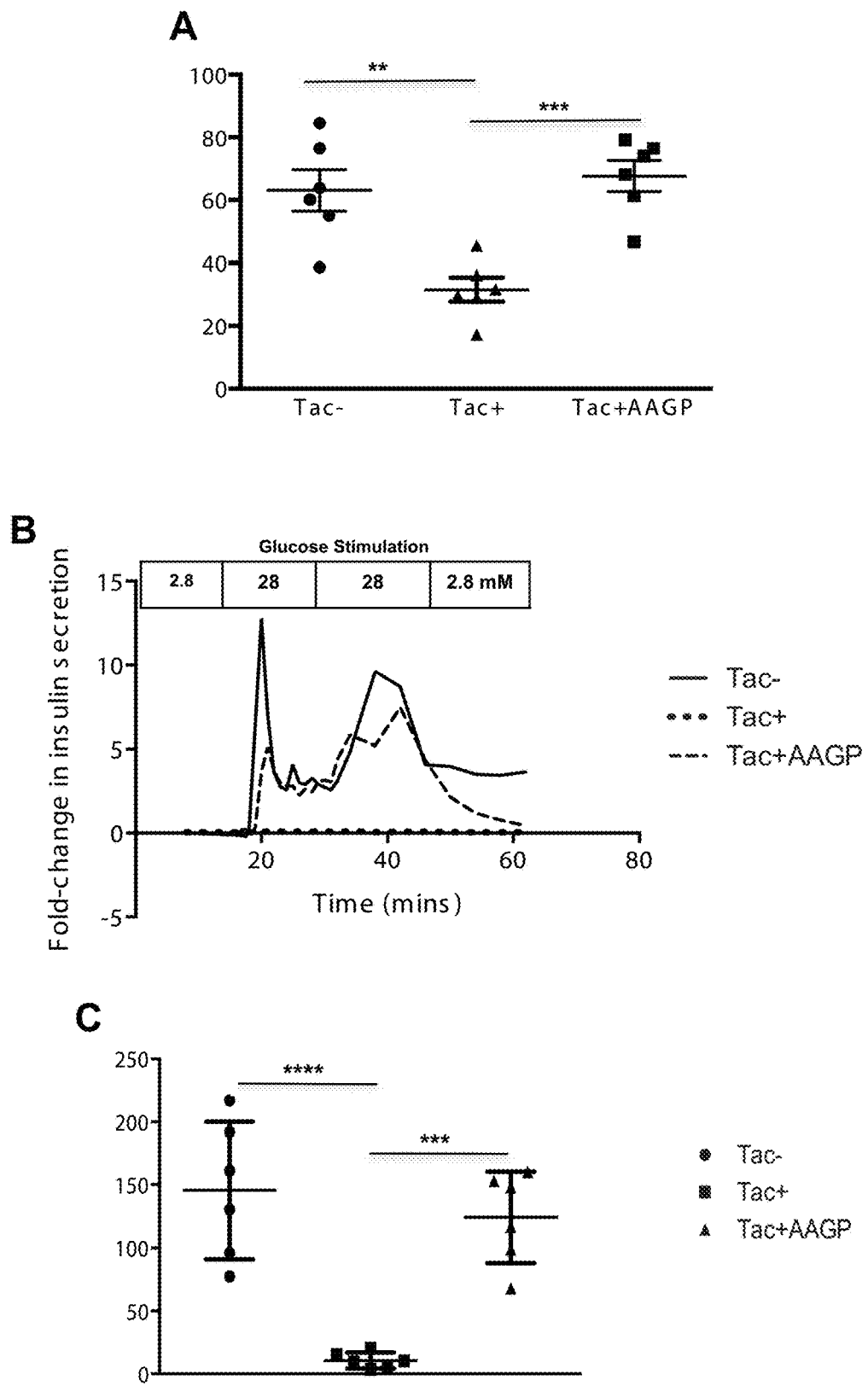
FIG. 5 illustrates in vitro assessment of human islets in culture with or without AAGP™ supplementation and tacrolimus exposure. A. Differences in islet recovery rate after culture and tacrolimus exposure. B. Functional assessment with perifusion curves comparing glucose-stimulated insulin secretion (GSIS) for the different culture conditions. C. Differences in area under the curve corresponding to the perifusion curves. Data points represent mean±SEM, n=6, p<0.01 and *p<0.001.

Supplementation with AAGP™ led to increased survival of islets after culture despite the presence of a known β-cell toxic agent, tacrolimus. The Tac+AAGP™ group showed similar a recovery rate to islets never exposed to tacrolimus. However, survival is significantly increased when compared to the Tac+ group (67.65% vs. 31.55%, p<0.001) (FIG. 5A). There is no difference in cell viability by membrane integrity stain (data not shown) but GSIS perifusion resulted in a marked difference in insulin secretion between Tac+ and Tac+AAGP™. The AAGP™ supplemented group showed a biphasic insulin response to glucose, similar to control islets, never exposed to tacrolimus. Conversely, the Tac+ group resulted in a highly impaired response (AUC: Tac− vs. Tac+, 158.8 vs. 8.22, p<0.001; Tac− vs. Tac+AAGP™, 158.8 vs. 129.3, p=0.231.; Tac+ vs. Tac+AAGP™, 8.22 vs. 129.3, p=0.003) (FIG. 5B, 5C).

Figure 6:
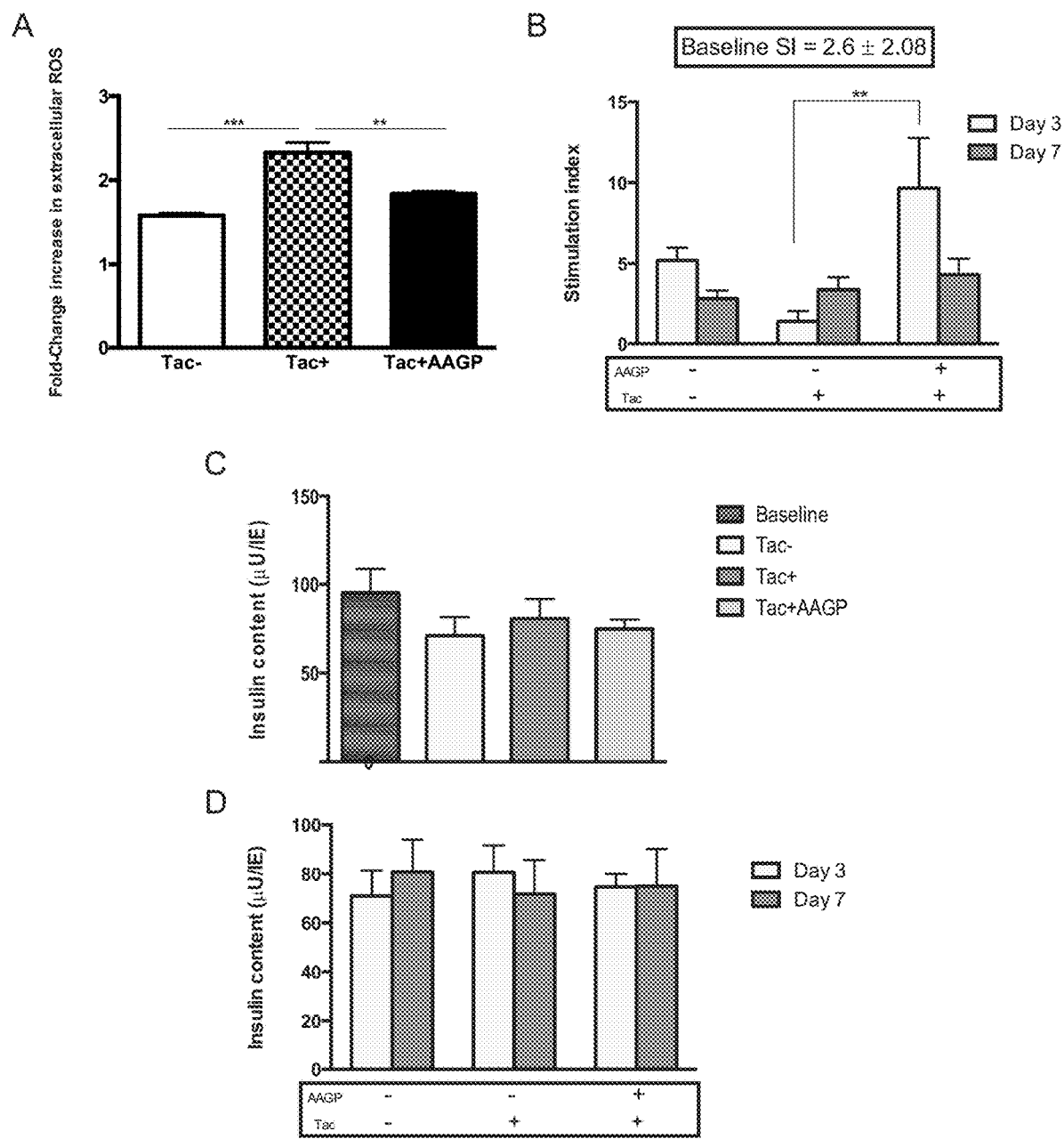
FIG. 6 illustrates (A) Increased extracellular reactive oxygen species (ROS) in human islets exposed to tacrolimus without AAGP™. Oxidative stress was measured by fold-increase in extracellular ROS analyzed with the Acridan Luminogen PS-3 assay (n=3). Islets were kept for 3 more days after AAGP™ and tacrolimus were washed from the media. GSIS static assays and intracellular insulin content was measured on day 3 (Tac present) and 7 (no Tac) for the different groups. (B) Stimulation index (SI) for group Tac+ is significantly decreased on day 3 in comparison with Tac+AAGP™. Day 7 SI are similar, showing function recovery once Tac is no longer present. Despite changes in function, no significant changes were seen in the intracellular content of insulin measured at baseline (C), as well as day 3 and 7 (D). Data points represent mean±SEM, triplicates from two different preparations.

Possible impact of AAGP™ on oxidative stress occurring to human islets during culture and exposure to tacrolimus is measured by fold-increase in extracellular ROS. Media samples are taken from each group 24 hr after tacrolimus exposure and analyzed with the Acridan Luminogen PS-3 assay. As expected, oxidative stress occurred in all samples but exposure to tacrolimus resulted in substantial increase in ROS (FIG. 6A). This phenomenon however is ameliorated in the presence of AAGP™ (p=0.012).

Isolated human islets from 6 different preparations were cultured in media supplemented with or without AAGP™ for 24 hours, were supplemented with tacrolimus, for another 24 hours. After a total 48 hours culture period all groups were characterized for in vitro survival, viability, function and oxidative stress.

As expected, oxidative stress occurred in all samples but exposure to tacrolimus resulted in substantial increase in ROS (FIG. 6A). This phenomenon however was ameliorated in the presence of AAGP™ (n=3, p<0.05).

Similar experimental conditions were recreated (human islets cultured with and without AAGP™ and exposed to tacrolimus) and aliquots of approximately 100 IEQ were collected on day 3 for each corresponding group to undergo s-GSIS assay and simultaneous intracellular insulin content. Islets were then extensively washed to remove tacrolimus and left in culture for 4 more days, when sampling and comparative testing was repeated on day 7.

As with the initial evaluation, Tac+ group showed a significantly impaired insulin secretion on day 3, not observed in the Tac+AAGP™ series (stimulation index 1.4 vs. 9.7, p<0.01, FIG. 6B). However, this decrease in insulin secretion was transient and differences among groups disappeared by the 7th day when tacrolimus was no longer present, adjusting for an expected overall diminished islet potency at the end of the culture period. Despite the differences in insulin secretion profile, the intracellular insulin content remained stable and comparable throughout the groups, indicating no changes to biosynthesis of insulin in beta cells (FIGS. 6C and 6D).

Example 16

AAGP™ does not Inhibit Tacrolimus' Immunosuppressant Capacity

Figure 7:
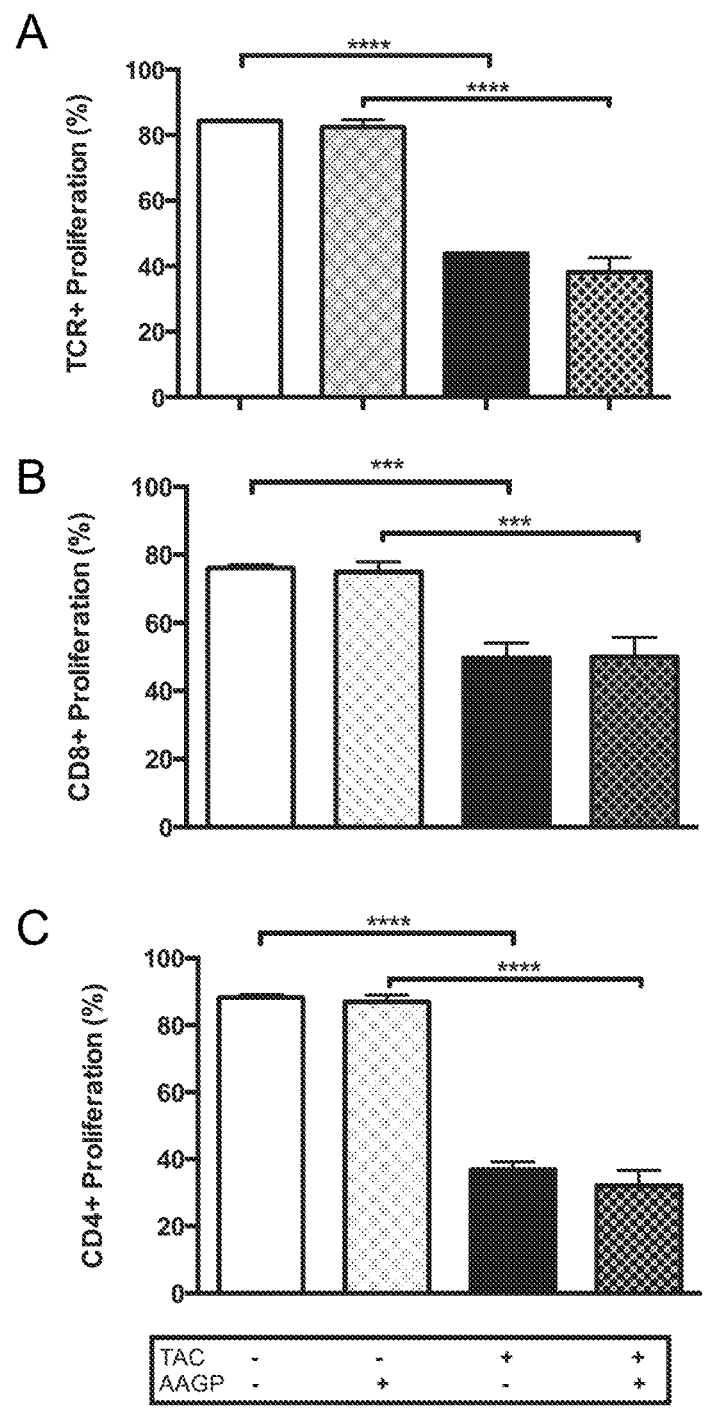
FIG. 7 illustrates that AAGP™ effect is not the result of direct drug inhibition with tacrolimus. Allogeneic mixed lymphocyte reaction (MLR) was used to evaluate direct drug inhibition. Results show a significant decrease of T cell proliferation in the presence of tacrolimus, AAGP™ and the combination of both, hence, proving no direct inhibition of tacrolimus by AAGP™. Data points represent mean±SEM, n=6, *p<0.001 and **p<0.0001.

To confirm that AAGP™ does not inhibit tacrolimus suppression of T cell proliferation a mixed lymphocyte reaction using mouse splenocytes was performed. The assay measures T cell proliferative response by levels of CFSE staining. As expected, T cell proliferation was significantly decreased in the presence of tacrolimus compared to IgG control (n=4, p<0.001). Proliferation of CD8+ and CD4+ positive T cells was also significantly decreased in the presence of tacrolimus alone or in combination with AAGP™ (n=4, p<0.001 in both cases). There was, however, no significant decrease in proliferation of T cells when exposure to AAGP™ alone occurred (FIG. 7).

Example 17

Tacrolimus Effect on Islet Intracellular Calcium Content and Exocytosis

Various electrophysiology studies were performed on human islets to elucidate a potential mechanism of action for the AAGP™ by characterizing the CNI-related injury and its avoidance. No significant differences in calcium influx were found between groups (FIGS. 8A, 8C), indicating that a possible mechanism of action was further downstream in the insulin pathway.

Figure 8:
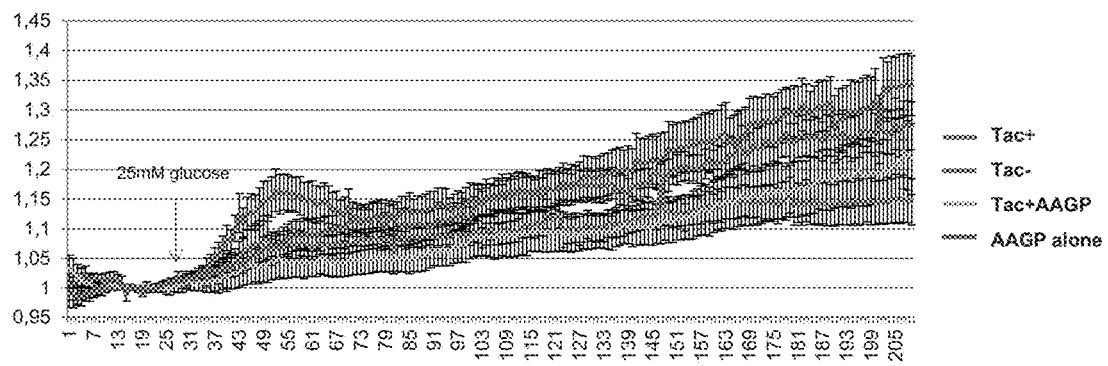
FIG. 8 illustrates that acute exposure to tacrolimus does not affect intracellular content of calcium but decreases exocytosis. Intra-islet calcium concentration remains unchanged despite the experimental interventions. (A) Comparative intracellular calcium concentration and (B) corresponding area under the curve (n=10-16 islets of two different preparations). Capacitance measurements were performed to functionally identify differences in exocytosis. (C) Decrease cumulative capacitance in Tac+ when compared to the rest of the groups, as well as in their corresponding area under the curve (D); indicating significant differences in exocytosis in-between groups. Data points represent mean±SEM, n=100 islets per group in triplicates, from two isolation.
Figure 8:
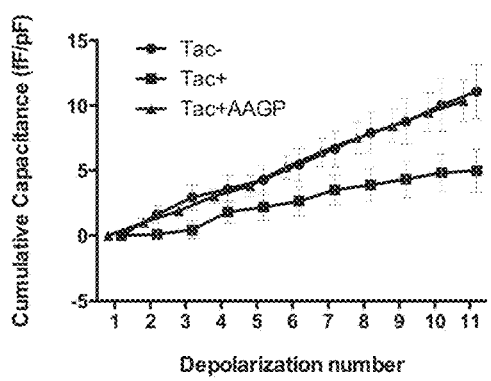
Figure 8:
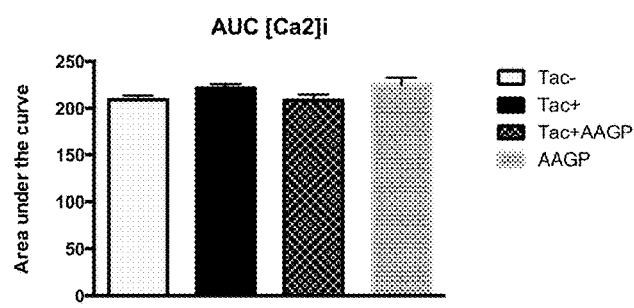
Figure 8:
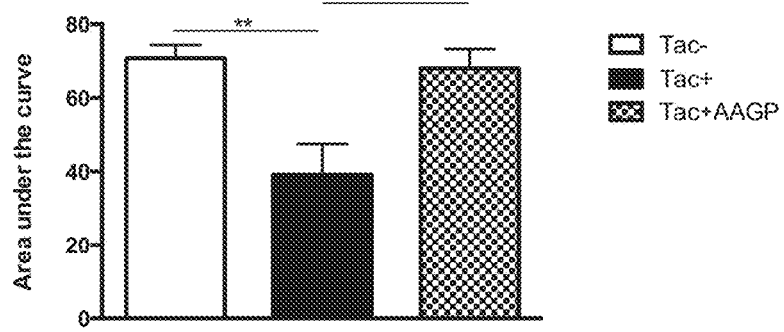

Complementary capacitance studies were performed with these same conditions as an indirect indicator of exocytosis upon high glucose stimulation. The results indicate a decrease cumulative capacitance for the Tac+ group compared to other groups and a significantly low area under the curve when compared to the Tac+AAGP™ group (AUC: 39.08 vs. 68.01, p<0.01) (FIGS. 8B, 8D).

Example 18

AAGP™ Ameliorates Inflammatory Response Immediately Post-Transplant

Further in vivo testing is performed to complement our in vitro findings. Using the same study groups (Tac−, Tac+ and Tac+AAGP™) minimal mass (1,000 IEQ) islet transplants are performed in chemically-induced diabetic immunodeficient mice (n=10 per group). In order to measure the possible effects of AAGP™ on localized post-transplant inflammatory response, the recovered grafts from three animals in each group (24 h after transplant) are homogenized and characterized for proinflammatory cytokines and chemokines.

Figure 9:
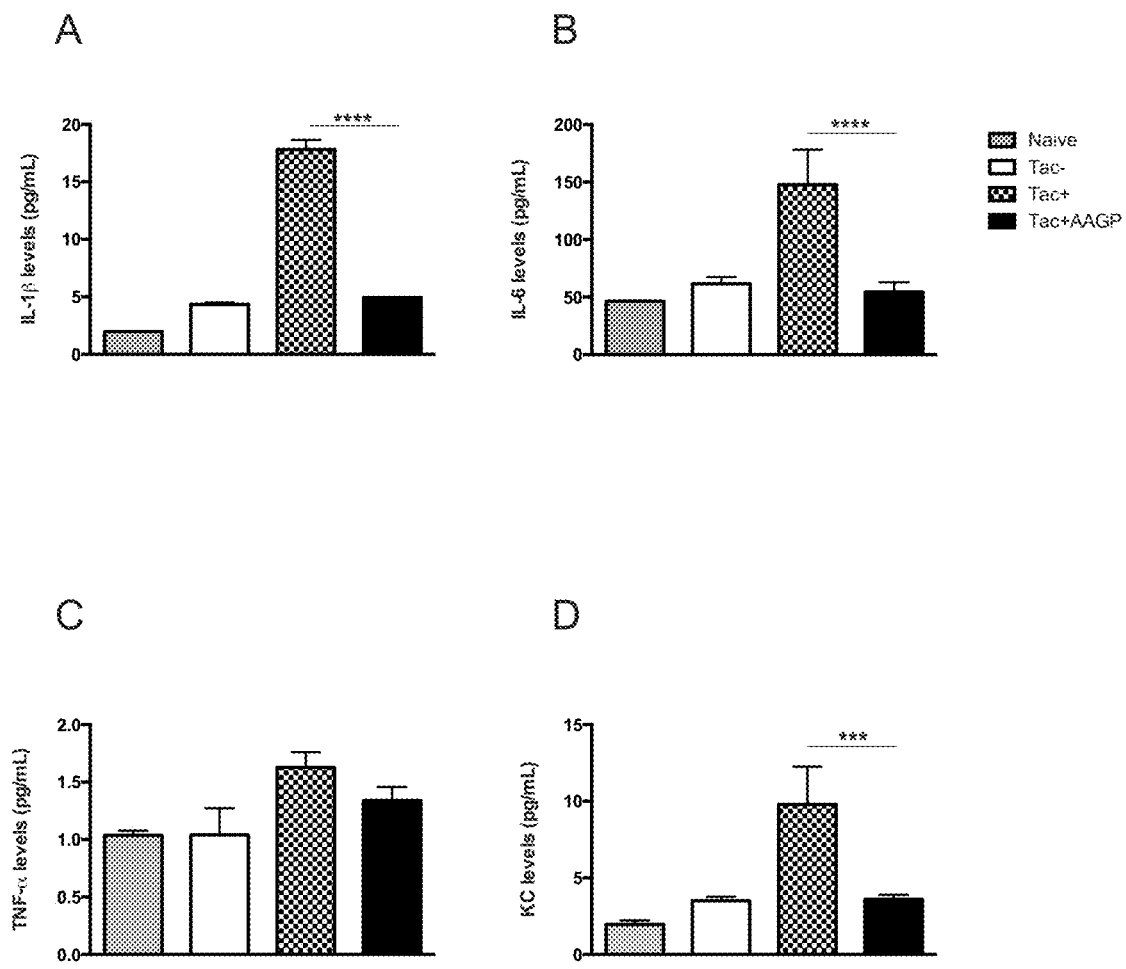
FIG. 9 illustrates the proinflammatory cytokines and chemokines acutely expressed (24 h) after transplantation. Concentration of IL-1β (A), IL-6 (B), TNF (C) and Keratinocyte chemokine (KC) (D) were measured locally to the graft by homogenization. (A) Concentrations of IL-1β, IL-6 and Keratinocyte chemokine (KC) were significantly lower in the engrafted islets previously treated with AAGP™. Cytokines were measured locally to the graft by homogenization (normalized per gram of tissue, n=3). Data points represent mean±SEM for pg/mL, normalized per gram of tissue, n=3, *p<0.001, **p<0.0001.

Acute levels of IL-1β are increased in all groups with respect to those in naïve mice. Levels in the Tac+ group are significantly higher but the addition of AAGP™ considerably dampened this cytokine excretion (17.81 vs. 4.94 pg/mL/g-tissue, p<0.001) (FIG. 9A). A similar effect is observed when measuring IL-6 levels, resulting in a significant decrease when in the presence of AAGP™ (147.8 vs. 54.4 pg/mL/g-tissue, p<0.001) (FIG. 9B). However there is no discernable difference in TNF-α levels between the tacrolimus-exposed groups (1.63 vs. 1.34 pg/mL/g-tissue) (FIG. 9C).

Among the chemokines acutely measured after transplant, KC secretion, involved in neutrophil recruitment, is associated with major secretion changes. As with IL-1β and IL-6, KC is significantly overexpressed in the Tac+ group and again, significantly reduced in the presence of AAGP™ (9.79 vs. 3.58 pg/mL/g-tissue, p<0.001) (FIG. 9D). No significant differences between groups are observed when comparing in vitro cytokine and chemokine expression (data not shown).

Example 19

AAGP™ Reduces Post-Transplant Islet Apoptosis

Figure 10:
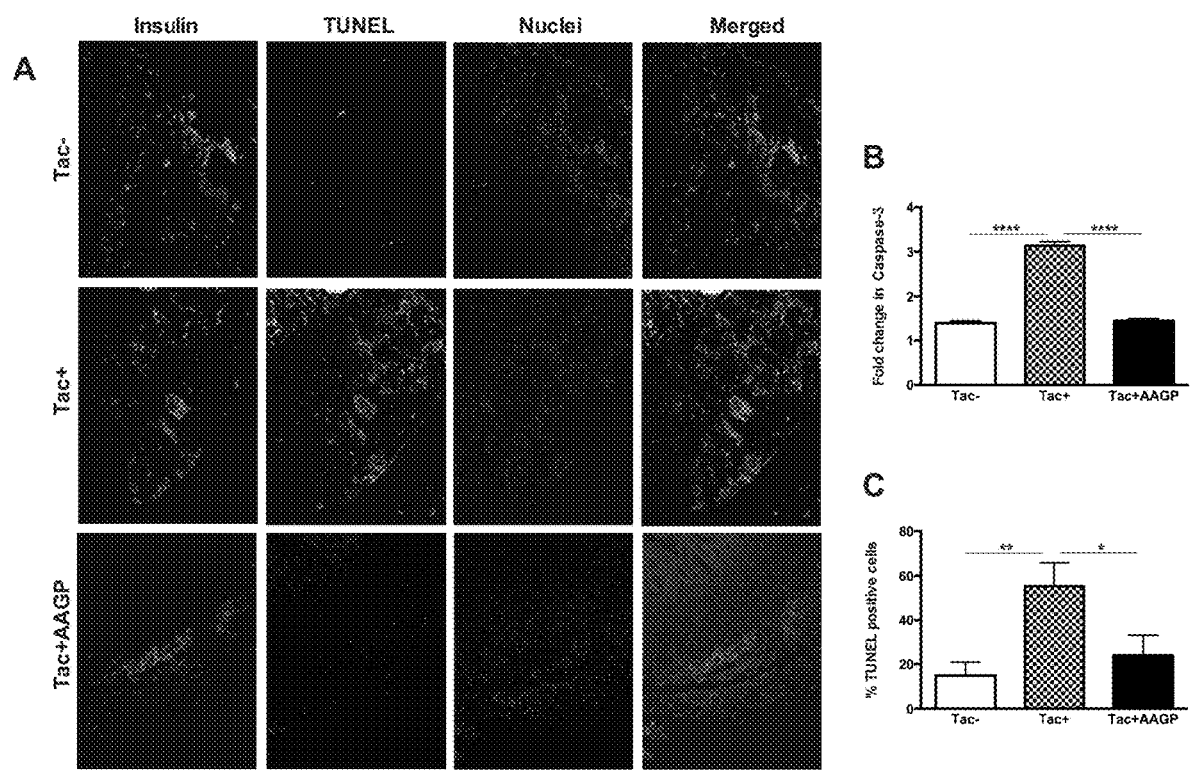
FIG. 10 illustrates the apoptosis acutely measured 24 h post-transplant. A. Representative slides showing multiple staining for insulin (red), TUNEL (green) and nuclei (blue). B. Percentage of TUNEL positive cells was measured and resulted significantly higher in Tac+ group. C. Concentration of cleaved caspase-3 locally expressed in the graft after homogenization also confirmed higher cell death rate in Tac+ group. Results are expressed as fold-change increase relative to naïve kidney tissue. Results are expressed as fold-change increase relative to naïve kidney tissue. C. Percentage of TUNEL positive cells in the different study groups as an expression of apoptosis acutely measured after transplant. Data points represent mean± SEM adjusted per gram of tissue, n=3, *p<0.05, p<0.01 and **p<0.0001.

Acutely removed grafts (24 h after transplant) are also analyzed for intra-graft apoptosis Fold-change increase in levels of cleaved casapse-3 are determined relative to basal levels in kidneys of naïve mice. There is a significant increase in levels of caspase-3 in the Tac+ group with respect to Tac+AAGP™, which essentially showed very similar levels to those of islets never exposed to tacrolimus (3.14 vs. 1.46, p<0.001) (FIG. 10B). The remaining graft section is further analyzed for apoptosis using TUNEL assay, showing consistent results with predominant percentage of TUNEL positive cells in the Tac+ group, when compared to Tac+ AAGP™ and control (53.3% vs. 24.0% vs. 14.9%, p<0.023) (FIG. 10A, 10O)

Example 20

Figure 11:
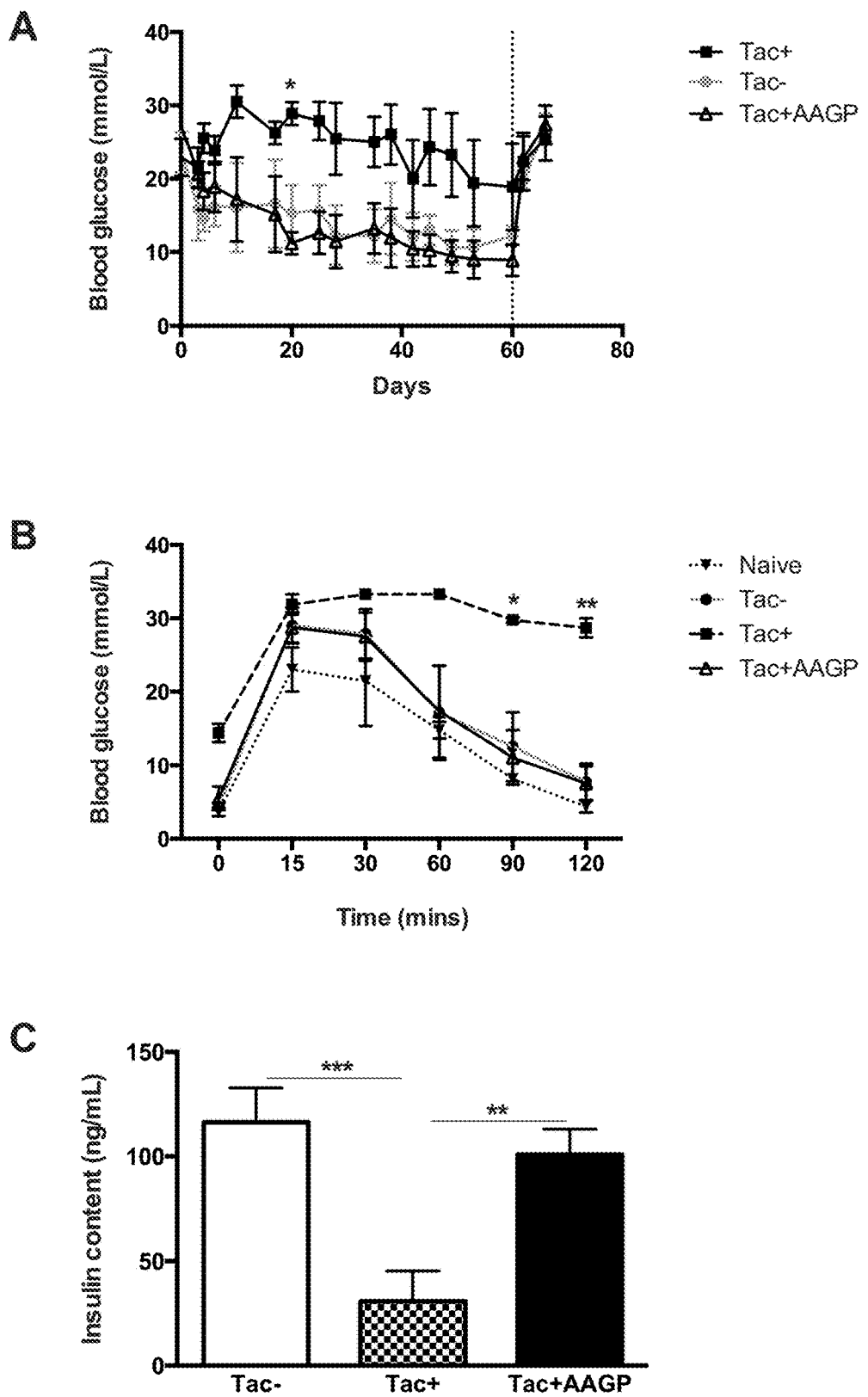
FIG. 11 illustrates the post-transplant graft function in immunodefficient mice receiving minimal human islet mass (~1000 IEQ). Islets were previously treated with AAGP™ and tracrolimus accordingly. A. Pooled blood glucose profiles demonstrating long-term graft function (60 days). The dotted line indicates graft recovery nephrectomy on day 60. B. Intraperitoneal glucose tolerance test (IPGTT) to evaluate metabolic response after receiving a glucose bolus. C. Insulin content of removed grafts after 60 days of transplant as an indication of residual islet mass. Data points represent mean±SEM adjusted per gram of tissue, (Tac− n=6, Tac+ n=3 and Tac+AAGP™ n=7), *p<0.05, p<0.01 and *p<0.001. D and E. Post-transplant graft function in mice receiving syngeneic full mass (~500 IEQ) islet transplant. AAGP™ was added to the culture media 1 hour prior to transplant and tacrolimus was administered via a subcutaneous osmotic pump (implanted during the same procedure) at a continuous rate of 1 mg/kg/day. D. Pooled blood glucose profiles of animal over 40 days with clear dysfunction for Tac+ islets during the presence of Tac. Vertical dotted line indicates tacrolimus treatment cessation and marks a gradual recovery of Tac+ grafts. Horizontal continuous line at y=11 indicates the normoglycemia limit. Graft recovery nephrectomy was again performed on day 30. E. Mean time-to-euglycemia after transplant showing Tac+AAGP™ mice reversing diabetes earlier (p<0.001, log-rank, Mantel-cox test). Finally, glucose tolerance tests showed a significant difference in graft response for Tac+ when mice were receiving tacrolimus (7 days) and when recipient were CNI free. These differences were not observed in the Tac+AAGP™ group.

Improved In-Vivo AAGP™-Supplemented Islets Function Despite Tacrolimus Exposure The remaining transplanted mice (n=7 per group) are followed up to 60 days post-transplant to determine transplant efficacy and evaluate long-term graft function. Blood glucose is monitored periodically to determine rates of euglycemia. As expected in this marginal islet mass model, delayed engraftment is observed. Blood glucose improved over time in the Tac− and the Tac+AAGP™ groups, in contrast to the Tac+ group where all mice remained hyperglycemic through until termination at Day 60 (FIG. 11A).

Sixty days post-transplant study groups underwent IPGTT to evaluate islet transplant function. The Tac− and Tac+AAGP™ groups both responded appropriately, but Tac+ remained highly diabetic by 120 min (AUC: Tac− vs. Tac+AAGP™, 92.63 vs. 91.20, p=0.095; Tac− vs. naïve, 92.63 vs. 71.43, p=0.434; Tac+AAGP™ vs. naïve, 91.20 vs. 71.43, p=0.423, and Tac+ vs. Tac+AAGP™, 149.8 vs. 91.2, p=0.021) (FIG. 11B).

To demonstrate that transplanted islets are solely responsible for the observed euglycemia, a graft recovery nephrectomy is performed at Day 60. All mice reverted to their previous diabetic state, confirmed also by weak insulin staining of their native pancreases (data not shown).

Upon graft recovery, insulin content is determined as an indicator of the residual islet mass after 60 days of transplant. FIG. 11O shows marked differences between groups with substantial insulin content reduction in grafts exposed to tacrolimus. Again, presence of AAGP™ is beneficial in islet protection despite exposure to tacrolimus (Tac+ vs. Tac+AAGP™, 30.86 vs. 100.8 ng/mL, p<0.01).

To further support these findings a transplant experiment was performed in a syngeneic diabetic mouse transplant model with continuous treatment with tacrolimus to resemble clinical practice. As in the in vitro settings, transplanted islets exposed to tacrolimus (higher concentration in this case to account for differences in murine metabolism of tacrolimus) were unable to effectively secrete insulin and return animals to euglycemic state. The presence of AAGP™, however, allowed islets to function normally and the period to achieve euglycemia was similar to the control group (FIG. 11D, 11E, p<0.001).

These findings were also observed when comparing initial intraperitoneal glucose tolerance tests (IPGTT) under tacrolimus treatment, with clear ineffective regulation in the Tac+ group when compared to the other groups (FIG. 11F, AUC: 101 vs. 54.69 and 59.26, p<0.01)

Once the tacrolimus treatment ceased, islets regained their normal function and animals became euglycemic like their study counterparts. In a repeat IPGTT at endpoint (30 days), differences vanished and all animals behaved similarly when challenged with a high glucose bolus (FIG. 11G).

DISCUSSION

Demonstrated herein is that addition of the potent AFP, AAGP™ to islet culture media affords considerable protection of human islet survival and in vitro function. Furthermore, AAGP™ protected human islets from tacrolimus-related injury, with benefit in vivo including engraftment, and markers of acute inflammation, apoptosis and long-term graft function.

Even though islet culture provides considerable flexibility in clinical transplantation, islet loss of 14-20% is routinely observed due to multiple factors from the donor and the isolation process (Kin T et al. Transplant international: official journal of the European Society for Organ Transplantation 2008; 21(11):1029-1035). When the culture media is supplemented with AAGP™, a significant improvement in islet recovery and function is consistently observed in different human islet preparations.

The mechanism by which AFP protect cells under hypothermia remains elusive. Various authors report a membrane-stabilizing role of these molecules preventing an incontrollable ion transfer occurring at low temperatures, which reduces risk for cell destruction (22). This mechanism may well apply to our experimental design given that erratic membrane permeability that may occur as a consequence of hypoxia and ischemia-reperfusion, even at normothermic conditions (Karle C et al. American journal of physiology Lung cellular and molecular physiology 2004; 286(6): L1154-1160; Weir E K et al. Cardiovascular research 2006; 71(4):630-641; Belliard A et al. American journal of physiology Heart and circulatory physiology 2013; 304(1):H94-103.).

Tacrolimus is a widely used immunosuppressant in the field of islet transplantation and a key element used routinely to reduce risk of acute, chronic rejection and recurrent autoimmunity (Shapiro A M et al. The New England journal of medicine 2000; 343(4):230-238.). However, the prolonged use of this and other CNIs have been associated with side effects, mainly nephrotoxicity and post-transplant diabetes (Chand D H et al. Pediatric transplantation 2001; 5(1):32-36). In fact both, tacrolimus and cyclosporine-related injury have been reported in islets, characterized by several mechanisms including calcineurin/nuclear factor of activated T-cells (NFAT) signaling inhibition (Oetjen E, et al. Molecular pharmacology 2003; 63(6):1289-1295), insulin gene suppression (Hernandez-Fisac I et al. American journal of transplantation 2007; 7(11):2455-2462), mitochondrial arrest (Rostambeigi N et al. Transplantation 2011; 91(6):615-623) and decreased post-transplant vascularization (Nishimura R et al. PloS one 2013; 8(4):e56799).

As shown herein, the in vitro presence of tacrolimus at clinically relevant dose was markedly deleterious to human islets by decreasing survival in culture and suppressing insulin secretion, whereas the addition of AAGP™ clearly protected human islets against this toxicity.

Islets are highly susceptible to hypoxia, occurring from donation through culture and intraportal transplantation. This phenomenon is mainly attributed to their high oxygen demand and size, responsible for creating detrimental $pO_2$ gradients depending on the seeding density during culture (Papas K K et al. Transplantation proceedings 2005; 37(8): 3412-3414). Islets are prone to oxidative stress due to decreased antioxidant capacity (Sklavos M M et al. Diabetes 2010; 59(7):1731-1738). These elements contribute to islet loss during culture and post-transplant. The findings show increased in oxidative stress in Tac+ group, as demonstrated by increased extracellular ROS in the culture media.

In vivo experiments are performed to complement all in vitro findings and to correlate supplementation with AAGP™ with early inflammation, cell death, engraftment and long-term efficacy. The graft characterization of acutely euthanized mice showed clear evidence of anti-inflammatory capabilities of the study compound. AAGP™-supplemented islets showed significantly reduced expression of IL-1β and IL-6, along with decreased secretion of keratinocyte chemokine, despite exposure to tacrolimus in culture. These cytokines and chemokines, along with TNF-α are key participants in the post-transplant inflammatory response and subsequent adaptive immunity activation (Kanak M A™ et al. International Journal of Endocrinology 2014).

Tacrolimus has also been associated with increased cell-death in islets (Johnson J D et al. Cell transplantation 2009; 18(8):833-845). The present experiments measured the fold change of cleaved caspase-3 in the graft as an indication of apoptosis, followed by TUNEL staining of the same grafts. Results consistently indicated reduced apoptosis in the AAGP™-supplemented group at similar levels to naïve human islets never exposed to tacrolimus.

Glucose tolerance test performed at the end of the study again showed similar glucose normalization rates for Tac- and Tac+AAGP™ groups, which are not significantly different from naïve mice. These results correlated with residual graft mass expressed as final insulin content. On the other hand, the deleterious effects of tacrolimus exposure without AAGP™ seemed to be sufficient to impair islets during the engraftment phase, showing no reduction in blood glucose and failure of glucose normalization after challenge with glucose bolus.

To make our experiments more clinically relevant, a new in vivo syngeneic mouse transplant model was performed, with tacrolimus as a continuous treatment by means of a subcutaneous osmotic pump. It was observed that the functional impairment of transplanted islets occurred immediately after starting administration of the CNI and lasted during the entire treatment period (7 days). Once the immunosuppression was stopped, the graft function was gradually normalized and by endpoint all groups were comparable.

Islets treated with AAGP™, however, did not seem to be affected by the presence of high doses of CNI and functioned flawlessly, similar to the control group.

These findings support previous in vitro experiments showing a temporary deleterious effect of tacrolimus, which may be reversed if the drug is removed. Obviously, tacrolimus cessation may not be a possibility in clinical settings at present times. Perhaps, the solution may be treating these individuals with AAGP™ concurrently to prolong the cytoprotective effect, although further regulatory toxicity studies are required before administering AAGP™ molecule to patients.

Despite gathering overwhelming evidence of beneficial effects of AAGP™ on islets, no clear mechanism of action for this drug or a mechanistic process to avoid tacrolimus toxicity are known. During these experiments it was demonstrated that there is no direct pharmacological inhibition of tacrolimus when in the presence of AAGP™ by performing a MLR assay with no interference of AAGP™ in tacrolimus anti-proliferative effect.

Furthermore, it was also found that neither tacrolimus nor AAGP™ affected the calcium concentration in islets, which are a key element in the insulin synthesis-secretion mechanism in beta cells. This information is supportive of recently published evidence pointing to a potential tacrolimus mechanistic site further downstream in the secretory pathway (Uchizono Y, et al. Endocrinology 2004; 145:2264-2272). In fact, capacitance measurements to islets did show significant differences between the groups Tac+ and TAC+AAGP™. These findings may be interpreted as an indication of impaired exocytosis, which is not observed in Tac+AAGP™.

In conclusion, supplementation of human islets with AAGP™ during culture improved the quality and yield of the final preparation and translated in to improved engraftment, even in the presence of the islet-toxic agent tacrolimus. This approach may potentially bring improvements to clinical transplantation as a potential strategy towards single donor islet transplantation. It may also open other promising avenues of research in cell, tissue and organ preservation.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for improving insulin secretory function of isolated human pancreatic islet cells, isolated human pancreatic islet progenitor cells, or both following a transplantation in a human patient in need thereof and immunosuppressed with an immunosuppressant drug, comprising the steps of:

a) contacting an isolated human pancreatic islet cell, an isolated human pancreatic islet progenitor cell, or both with a gem-difluorinated C-glycopeptide compound of formula III, or a pharmaceutically acceptable base, addition salt with an acid, hydrate or solvate thereof:

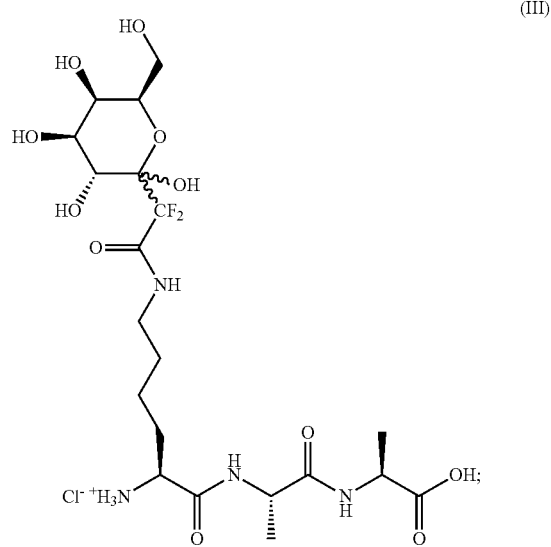

(III)

and b) contacting the isolated human pancreatic islet cell, the isolated human pancreatic islet progenitor cells, or both of step a), prior to the transplantation in said human patient, with the immunosuppressant drug;

wherein the immunosuppressant drug is sirolimus, tacrolimus, cyclosporine, or any combination thereof;

wherein the insulin secretory function of the transplanted isolated human pancreatic islet cells, isolated human pancreatic islet progenitor cells, or both, contacted with the compound of formula III, is improved in comparison to transplanted isolated human pancreatic islet cells, isolated human pancreatic islet progenitor cells, or both, contacted with the immunosuppressant drug and not contacted with the compound of formula III.

2. The method of claim 1, further comprising
c) transplanting the treated isolated human pancreatic islet cell, the isolated human pancreatic islet progenitor cell, or both, of step a) in said human patient.

3. The method of claim 2, further comprising step a') before step a):
a') isolating human pancreatic islet cells, human pancreatic islet progenitor cells, or both.

4. The method of claim 1, wherein said isolated human pancreatic islet cell is an isolated human alpha cell, an isolated human beta cell, an isolated human delta cell, an isolated human gamma cell, an isolated human epsilon cell, or a combination thereof.

5. The method of claim 1, wherein said isolated human pancreatic islet cell is an isolated human beta cell.

6. The method of claim 1, wherein said isolated human pancreatic islet cell is isolated from a live human donor, a cadaveric human donor, or combinations thereof.

7. The method of claim 1, wherein the isolated human pancreatic islet cell, the isolated human pancreatic islet progenitor cell, or both are contacted with the compound for an hour.

8. The method of claim 1, wherein concentration of said compound is from about 1 mg/ml to about 5 mg/ml.

9. The method of claim 8, wherein concentration of said compound in step a) is from about 1 mg/ml to about 3 mg/ml, or from about 3 mg/ml to about 5 mg/ml.

10. A method for improving insulin secretion of isolated human pancreatic islet cells, isolated human pancreatic islet progenitor cells, or both, following a transplantation in a human patient in need thereof and immunosuppressed with an immunosuppressant drug, comprising the steps of:
a) contacting an isolated human pancreatic islet cell, an isolated human pancreatic islet progenitor cell, or both with a gem-difluorinated C-glycopeptide compound of formula III, or a pharmaceutically acceptable base, addition salt with an acid, hydrate or solvate thereof:

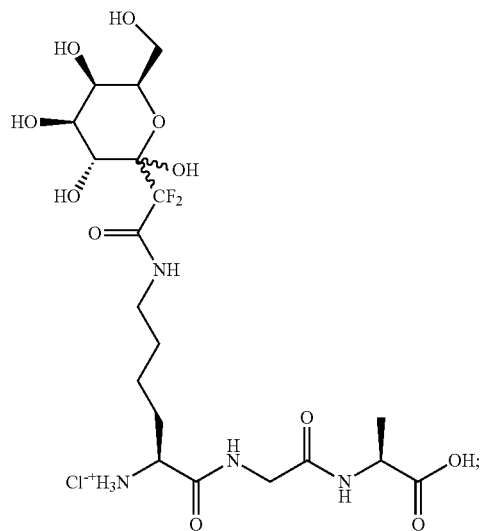

and
b) contacting the isolated human pancreatic islet cell, the isolated human pancreatic islet progenitor cells, or both of step a)), prior to the transplantation in said human patient, with the immunosuppressant drug:
wherein the immunosuppressant drug is sirolimus, tacrolimus, cyclosporine, or any combination thereof;
wherein the insulin secretion of the transplanted isolated human pancreatic islet cells, isolated human pancreatic islet progenitor cells, or both contacted with the compound of formula III is improved in comparison to transplanted isolated human pancreatic islet cells, isolated human pancreatic islet progenitor cells, or both, contacted with the immunosuppressant drug and not contacted with the compound of formula III.

* * * * *